(12) United States Patent

Zhu et al.

(10) Patent No.: US 12,177,705 B2
(45) Date of Patent: Dec. 24, 2024

(54) METHOD FOR REPORTING USER EQUIPMENT CAPABILITY INFORMATION AND DEVICE

(71) Applicant: HUAWEI TECHNOLOGIES CO., LTD., Shenzhen (CN)

(72) Inventors: Peng Zhu, Shanghai (CN); Qian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 17/568,863

(22) Filed: Jan. 5, 2022

(65) Prior Publication Data

US 2022/0132354 A1 Apr. 28, 2022

Related U.S. Application Data

(63) Continuation of application No. PCT/CN2020/100273, filed on Jul. 3, 2020.

(30) Foreign Application Priority Data

Jul. 5, 2019 (CN) .......................... 201910606314.9

(51) Int. Cl.
*H04W 24/10* (2009.01)
(52) U.S. Cl.
CPC .................. *H04W 24/10* (2013.01)
(58) Field of Classification Search
CPC .................................................... H04W 24/10
See application file for complete search history.

(56) References Cited

U.S. PATENT DOCUMENTS

| | | | |
|---|---|---|---|
| 2009/0046596 A1 | 2/2009 | Ewe et al. | |
| 2011/0319069 A1* | 12/2011 | Li | H04W 8/22 |
| | | | 455/422.1 |
| 2012/0040687 A1* | 2/2012 | Siomina | G01S 5/019 |
| | | | 455/422.1 |
| 2014/0162642 A1 | 6/2014 | Kwon et al. | |
| 2016/0192350 A1* | 6/2016 | Yi | H04L 5/0035 |
| | | | 370/329 |
| 2017/0078997 A1 | 3/2017 | Dinan | |
| 2017/0222856 A1 | 8/2017 | Dinan | |
| 2018/0219652 A1* | 8/2018 | Chen | H04W 88/023 |
| 2018/0367230 A1* | 12/2018 | Su | H04W 72/1215 |

FOREIGN PATENT DOCUMENTS

| | | |
|---|---|---|
| CN | 102811486 A | 12/2012 |
| CN | 109618419 A | 4/2019 |

(Continued)

OTHER PUBLICATIONS

R2-1817707, Intel Corporation et al, CR on signaling contiguous and non-contiguous EN-DC capability, 3GPP TSG-RAN2 Meeting #104, Spokane, USA, Nov. 12 2018-Nov. 16, 2018, 3 pages.

(Continued)

*Primary Examiner* — Brenda H Pham
(74) *Attorney, Agent, or Firm* — Rimon PC

(57) ABSTRACT

Embodiments of this application provide a method for reporting user equipment capability information and related device. A user equipment (UE) receives user equipment capability enquiry information sent by a network device, and reports the carrier aggregation capability of the user equipment by sending user equipment capability information to the network device, where the carrier aggregation capability of the user equipment includes the information that the downlink carriers of the UE in different radio access technologies are contiguous and the uplink carriers of the UE in the different radio access technologies are non-contiguous.

20 Claims, 6 Drawing Sheets

(56) References Cited

FOREIGN PATENT DOCUMENTS

| CN | 109874412 A | 6/2019 | |
|---|---|---|---|
| EP | 2717640 A1 | 4/2014 | |
| EP | 3125643 A1 | 2/2017 | |
| WO | WO-2012044232 A2 * | 4/2012 | ............ H04W 36/06 |
| WO | 2013067030 A1 | 5/2013 | |
| WO | 2016164775 A1 | 10/2016 | |

OTHER PUBLICATIONS

R4-1803551, Intel Corporation, WF on UE feature list for CA/EN-DC, other capability and LTE-NR co-existence, 3GPP TSG-RAN WG4 Meeting 86, Athens, Greece, Feb. 26-Mar. 2, 2018 Agenda Item: 7.1, 26 pages, XP051403875.

3GPP TS 38.101-1 V15.6.0 (Jun. 2019), 3rd Generation Partnership Project;Technical Specification Group Radio Access Network;NR;User Equipment (UE) radio transmission and reception;Part 1: Range 1 Standalone(Release 15), 229 pages.

R2-1818898, Intel Corporation et al, CR on signaling contiguous and non-contiguous EN-DC capability, 3GPP TSG-RAN2 Meeting #104, Spokane, USA, Nov. 12, 2018-Nov. 16, 2018, 3 pages.

3GPP TS 38.306 V16.0.0 (Mar. 2020), 3rd Generation Partnership Project; Technical Specification Group Radio Access Network; NR; User Equipment (UE) radio access capabilities (Release 16), 64 pages, XP051868956.

R2-1818899, Intel Corporation et al, CR on signaling contiguous and non-contiguous EN-DC capability, 3GPP TSG-RAN2 Meeting #104, Spokane, USA, Nov. 12, 2018-Nov. 16, 2018, 4 pages.

\* cited by examiner

METHOD FOR REPORTING USER EQUIPMENT CAPABILITY INFORMATION AND DEVICE

CROSS-REFERENCE TO RELATED APPLICATIONS

This application is a continuation of International Application No. PCT/CN2020/100273, filed on Jul. 3, 2020, which claims priority to Chinese Patent Application No. 201910606314.9, filed on Jul. 5, 2019. The disclosures of the aforementioned applications are hereby incorporated by reference in their entireties.

TECHNICAL FIELD

This application relates to the field of communication technologies, and in particular, to a method for reporting user equipment capability information and a device.

BACKGROUND

In a control plane signaling procedure of a fifth generation (5G) mobile communication technology, after an initial connection is established between a user equipment (UE) and a network device, the network device may enquire the capability of the UE by using the following signaling procedure: The network device sends UE capability enquiry information to the UE to request to enquire the capability of the UE, and the UE reports the capability of the UE to the network device via UE capability information after receiving the UE capability enquiry information.

For a UE supporting EUTRA-NR dual connectivity (ENDC), a capability of the UE may include whether a downlink carrier in a long term evolution (LTE) system and a downlink carrier in a new radio (NR) system are contiguous and whether an uplink carrier in the LTE system and an uplink carrier in the NR system are contiguous.

However, for the UE supporting the ENDC, when the capability of the UE includes that the downlink carrier in the LTE system and the downlink carrier in the NR system are contiguous and the uplink carrier in the LTE system and the uplink carrier in the NR system are non-contiguous, the UE cannot report such capability by using existing UE capability information. Consequently, a network device cannot allocate an appropriate communication resource to the UE based on the UE's capability, and the communication quality of the UE is affected.

SUMMARY

Embodiments of this application provide a method for reporting user equipment capability information and related device, so that a user equipment can relatively comprehensively report its carrier aggregation capability to a network device, so that the network device allocates an appropriate resource to the user equipment.

To achieve the foregoing objectives, the following technical solutions are used in the embodiments of this application.

According to a first aspect, an embodiment of this application provides a method for reporting user equipment (UE) capability information. The method includes: receiving, by a UE, UE capability enquiry information from a network device, where the UE supports a plurality of different radio access technologies, and the UE capability enquiry information is used to enquire a capability of the UE; and sending, by the UE, UE capability information to the network device based on the UE capability enquiry information, where the UE capability information indicates a carrier aggregation capability of the UE, and the carrier aggregation capability of the UE includes that the downlink carriers in the different radio access technologies are contiguous and the uplink carriers in the different radio access technologies are non-contiguous.

According to the technical solution provided in the first aspect, because the carrier aggregation capability of the UE reported by the UE to the network device includes that the downlink carriers in the different radio access technologies are contiguous and the uplink carriers in the different radio access technologies are non-contiguous, the network device may allocate an appropriate communication resource to the UE based on the received UE capability information, to improve communication quality.

With reference to the first aspect, in a first possible implementation, the UE capability information includes first indication information and second indication information; the first indication information indicates that the downlink carriers in the different radio access technologies are contiguous and the uplink carriers in the different radio access technologies are non-contiguous and whether the second indication information is valid; and the second indication information indicates at least one of the following: both the downlink carriers in the different radio access technologies and the uplink carriers in the different radio access technologies are contiguous, and neither the downlink carriers in the different radio access technologies nor the uplink carriers in the different radio access technologies are contiguous. Based on the first possible implementation of the first aspect, the UE may report the carrier aggregation capability of the UE to the network device by using the first indication information and the second indication information that are included in the UE capability information, where the carrier aggregation capability of the UE includes that the downlink carriers in the different radio access technologies are contiguous and the uplink carriers in the different radio access technologies are non-contiguous. Therefore, the network device may allocate the appropriate communication resource to the UE based on the received UE capability information, to improve the communication quality.

With reference to the first possible implementation of the first aspect, in a second possible implementation, the UE capability information includes a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid. Based on the second possible implementation of the first aspect, the UE capability information includes the first field, and the first field carries the first state value. Based on this, the UE may report the carrier aggregation capability of the UE to the network device, where the carrier aggregation capability of the UE includes that the downlink carriers in the different radio access technologies are contiguous and the uplink carriers in the different radio access technologies are non-contiguous. Therefore, the network device may allocate the appropriate communication resource to the UE based on the received UE capability information, to improve the communication quality.

With reference to the first possible implementation of the first aspect, in a third possible implementation, the carrier aggregation capability of the UE further includes at least one of the following: both the downlink carriers in the different radio access technologies and the uplink carriers in the different radio access technologies are contiguous and neither the downlink carriers in the different radio access technologies nor the uplink carriers in the different radio access technologies are contiguous; and the UE capability information includes a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid. Based on the third possible implementation of the first aspect, the UE capability information includes the first field, and the first field carries the second state value. Based on this, the UE may report, to the network device, that the downlink carriers in the different radio access technologies are contiguous and the uplink carriers in the different radio access technologies are non-contiguous and that the second indication information is valid. In addition, the UE reports at least one of the following to the network device by using the second indication information included in the UE capability information: both the downlink carriers in the different radio access technologies and the uplink carriers in the different radio access technologies are contiguous and neither the downlink carriers in the different radio access technologies nor the uplink carriers in the different radio access technologies are contiguous. Therefore, the network device may allocate the appropriate communication resource to the UE based on the received UE capability information, to improve the communication quality.

With reference to the first aspect, in a fourth possible implementation, when a quantity of the uplink carriers in the different radio access technologies is less than a quantity of the downlink carriers in the different radio access technologies, the carrier aggregation capability of the UE further includes that both the uplink carriers in the different radio access technologies and the downlink carriers in the different radio access technologies are contiguous and the downlink carriers in the different radio access technologies are contiguous and the uplink carriers in the different radio access technologies are non-contiguous. Based on the fourth possible implementation of the first aspect, when the quantity of the uplink carriers in the different radio access technologies is less than the quantity of the downlink carriers in the different radio access technologies, the carrier aggregation capability of the UE reported by the UE to the network device includes: that the downlink carriers in the different radio access technologies are contiguous and the uplink carriers in the different radio access technologies are non-contiguous and that both the uplink carriers in the different radio access technologies and the downlink carriers in the different radio access technologies are contiguous and the downlink carriers in the different radio access technologies are contiguous and the uplink carriers in the different radio access technologies are non-contiguous. Therefore, the network device may allocate the appropriate communication resource to the UE based on the received UE capability information, to improve the communication quality.

With reference to the fourth possible implementation of the first aspect, in a fifth possible implementation, the UE capability information includes carrier aggregation capability indication information of the UE and a second field, and the second field carries a value of the carrier aggregation capability indication information of the UE; and when the value of the carrier aggregation capability indication information of the UE is a third state value, the UE capability information indicates that the downlink carriers in the different radio access technologies are contiguous and the uplink carriers in the different radio access technologies are non-contiguous. Based on the fifth possible implementation of the first aspect, the UE capability information includes the second field, and the second field carries the third state value. Based on this, the UE may report, to the network device, that the downlink carriers in the different radio access technologies are contiguous and the uplink carriers in the different radio access technologies are non-contiguous. Therefore, the network device may allocate the appropriate communication resource to the UE based on the received UE capability information, to improve the communication quality.

With reference to the fifth possible implementation of the first aspect, in a sixth possible implementation, when the value of the carrier aggregation capability indication information of the UE is a fourth state value, the UE capability information indicates: that both the uplink carriers in the different radio access technologies and the downlink carriers in the different radio access technologies are contiguous, and that the downlink carriers in the different radio access technologies are contiguous and the uplink carriers in the different radio access technologies are non-contiguous. Based on the sixth possible implementation of the first aspect, the UE capability information includes the second field, and the second field carries the fourth state value. Based on this, the UE may report, to the network device, that both the uplink carriers in the different radio access technologies and the downlink carriers in the different radio access technologies are contiguous and the downlink carriers in the different radio access technologies are contiguous and the uplink carriers in the different radio access technologies are non-contiguous. Therefore, the network device may allocate the appropriate communication resource to the UE based on the received UE capability information, to improve the communication quality.

According to a second aspect, an embodiment of this application provides a method for reporting user equipment (UE) capability information. The method includes: sending, by a network device, UE capability enquiry information to a UE, where the UE supports a plurality of different radio access technologies, and the UE capability enquiry information is used to enquire a capability of the UE; and receiving, by the network device, UE capability information from the UE, where the UE capability information indicates a carrier aggregation capability of the UE, and the carrier aggregation capability of the UE includes that downlink carriers in the different radio access technologies are contiguous and uplink carriers in the different radio access technologies are non-contiguous.

According to the technical solution provided in the second aspect, the network device may send the UE capability enquiry information to the UE, receive the UE capability information from the UE, and determine the carrier aggregation capability of the UE based on the UE capability information. The carrier aggregation capability of the UE may include that the downlink carriers in the different radio access technologies are contiguous and the uplink carriers in the different radio access technologies are non-contiguous, so that the network device allocates an appropriate communication resource to the UE based on the carrier aggregation capability of the UE, to improve communication quality.

With reference to the second aspect, in a first possible implementation, the UE capability information includes first indication information and second indication information; the first indication information indicates that the downlink carriers in the different radio access technologies are contiguous and the uplink carriers in the different radio access technologies are non-contiguous and whether the second indication information is valid; and the second indication information indicates at least one of the following: both the downlink carriers in the different radio access technologies and the uplink carriers in the different radio access technologies are contiguous and neither the downlink carriers in the different radio access technologies nor the uplink carriers in the different radio access technologies are contiguous. Based on the first possible implementation of the second aspect, the network device may determine the carrier aggregation capability of the UE based on the first indication information and the second indication information that are included in the UE capability information, where the carrier aggregation capability of the UE includes that the downlink carriers in the different radio access technologies are contiguous and the uplink carriers in the different radio access technologies are non-contiguous, so that the network device can allocate the appropriate communication resource to the UE based on the carrier aggregation capability of the UE, to improve the communication quality.

With reference to the first possible implementation of the second aspect, in a second possible implementation, the UE capability information includes a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid. Based on the second possible implementation of the second aspect, the UE capability information includes the first field, and the first field carries the first state value. Based on this, the network device may determine the carrier aggregation capability of the UE, where the carrier aggregation capability of the UE includes that the downlink carriers in the different radio access technologies are contiguous and the uplink carriers in the different radio access technologies are non-contiguous, so that the network device can allocate the appropriate communication resource to the UE based on the carrier aggregation capability of the UE, to improve the communication quality.

With reference to the first possible implementation of the second aspect, in a third possible implementation, the carrier aggregation capability of the UE further includes at least one of the following: both the downlink carriers in the different radio access technologies and the uplink carriers in the different radio access technologies are contiguous and neither the downlink carriers in the different radio access technologies nor the uplink carriers in the different radio access technologies are contiguous; and the UE capability information includes a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid. Based on the third possible implementation of the second aspect, the UE capability information includes the first field, and the first field carries the second state value. Based on this, the network device may determine that the carrier aggregation capability of the UE includes that the downlink carriers in the different radio access technologies are contiguous and the uplink carriers in the different radio access technologies are non-contiguous. In addition, the network device determines, based on the second indication information, that the carrier aggregation capability of the UE further includes at least one of the following: both the downlink carriers in the different radio access technologies and the uplink carriers in the different radio access technologies are contiguous and neither the downlink carriers in the different radio access technologies nor the uplink carriers in the different radio access technologies are contiguous, so that the network device can allocate the appropriate communication resource to the UE based on the carrier aggregation capability of the UE, to improve the communication quality.

With reference to the second aspect, in a fourth possible implementation, when a quantity of the uplink carriers in the different radio access technologies is less than a quantity of the downlink carriers in the different radio access technologies, the carrier aggregation capability of the UE further includes that both the uplink carriers in the different radio access technologies and the downlink carriers in the different radio access technologies are contiguous and the downlink carriers in the different radio access technologies are contiguous and the uplink carriers in the different radio access technologies are non-contiguous. Based on the fourth possible implementation of the second aspect, when the quantity of the uplink carriers in the different radio access technologies is less than the quantity of the downlink carriers in the different radio access technologies, the network device may determine, based on the UE capability information, that the carrier aggregation capability of the UE includes that the downlink carriers in the different radio access technologies are contiguous and the uplink carriers in the different radio access technologies are non-contiguous and that both the uplink carriers in the different radio access technologies and the downlink carriers in the different radio access technologies are contiguous and the downlink carriers in the different radio access technologies are contiguous and the uplink carriers in the different radio access technologies are non-contiguous, so that the network device can allocate the appropriate communication resource to the UE based on the carrier aggregation capability of the UE, to improve the communication quality.

With reference to the fourth possible implementation of the second aspect, in a fifth possible implementation, the UE capability information includes carrier aggregation capability indication information of the UE and a second field, and the second field carries a value of the carrier aggregation capability indication information of the UE; and when the value of the carrier aggregation capability indication information of the UE is a third state value, the UE capability information indicates that the downlink carriers in the different radio access technologies are contiguous and the uplink carriers in the different radio access technologies are non-contiguous. Based on the fifth possible implementation of the second aspect, the UE capability information includes the second field, and the second field carries the third state value. Based on this, the network device may determine that the carrier aggregation capability of the UE includes that the downlink carriers in the different radio access technologies are contiguous and the uplink carriers in the different radio access technologies are non-contiguous, so that the network device can allocate the appropriate communication resource to the UE based on the carrier aggregation capability of the UE, to improve the communication quality.

With reference to the fifth possible implementation of the second aspect, in a sixth possible implementation, when the value of the carrier aggregation capability indication information of the UE is a fourth state value, the UE capability information indicates that both the uplink carriers in the different radio access technologies and the downlink carriers in the different radio access technologies are contiguous and the downlink carriers in the different radio access technologies are contiguous and the uplink carriers in the different radio access technologies are non-contiguous. Based on the sixth possible implementation of the second aspect, the UE capability information includes the second field, and the second field carries the fourth state value. Based on this, the network device may determine that the carrier aggregation capability of the UE includes that both the uplink carriers in the different radio access technologies and the downlink carriers in the different radio access technologies are contiguous and the downlink carriers in the different radio access technologies are contiguous and the uplink carriers in the different radio access technologies are non-contiguous, so that the network device can allocate the appropriate communication resource to the UE based on the carrier aggregation capability of the UE, to improve the communication quality.

According to a third aspect, an embodiment of this application provides a method for reporting user equipment (UE) capability information. The method includes: receiving, by a UE, UE capability enquiry information from a network device, where the UE supports a plurality of different radio access technologies, and the UE capability enquiry information is used to enquire a capability of the UE; and sending, by the UE, UE capability information to the network device based on the UE capability enquiry information, where the UE capability information includes third indication information and fourth indication information. The third indication information indicates whether downlink carriers in the different radio access technologies are contiguous, and the fourth indication information indicates whether uplink carriers in the different radio access technologies are contiguous.

According to the technical solution provided in the third aspect, the UE may report, to the network device by using the third indication information and the fourth indication information that are included in the UE capability information, whether the uplink carriers in the different radio access technologies are contiguous and whether the downlink carriers in the different radio access technologies are contiguous, so that the network device allocates an appropriate communication resource to the UE.

With reference to the third aspect, in a first possible implementation, when the UE capability information does not include a third field, the third indication information indicates that the downlink carriers in the different radio access technologies are contiguous; the UE capability information includes a fourth field, and the fourth field carries a value of the fourth indication information; and when the value of the fourth indication information is a fifth state value, the fourth indication information indicates that the uplink carriers in the different radio access technologies are non-contiguous. Based on the first possible implementation of the third aspect, the UE may report, to the network device by using the third indication information and the fourth indication information, that a carrier aggregation capability of the UE includes that the downlink carriers in the different radio access technologies are contiguous and the uplink carriers in the different radio access technologies are non-contiguous. Therefore, the network device may allocate the appropriate communication resource to the UE based on the received UE capability information, to improve communication quality.

With reference to the third aspect, in a second possible implementation, the UE capability information includes a third field and a fourth field, the third field carries a value of the third indication information, and the fourth field carries a value of the fourth indication information. Based on the second possible implementation of the third aspect, the UE may report, to the network device by using the third indication information and the fourth indication information, that a carrier aggregation capability of the UE includes that the downlink carriers in the different radio access technologies are contiguous and the uplink carriers in the different radio access technologies are non-contiguous, that neither the downlink carriers in the different radio access technologies nor the uplink carriers in the different radio access technologies are contiguous, and that neither the downlink carriers in the different radio access technologies nor the uplink carriers in the different radio access technologies are contiguous and both the downlink carriers in the different radio access technologies and the uplink carriers in the different radio access technologies are contiguous. Therefore, the network device may allocate the appropriate communication resource to the UE based on the received UE capability information, to improve communication quality.

With reference to the third aspect, in a third possible implementation, when the UE capability information does not include a third field and a fourth field, the third indication information indicates that the downlink carriers in the different radio access technologies are contiguous, and the fourth indication information indicates that the uplink carriers in the different radio access technologies are contiguous. Based on the third possible implementation of the third aspect, the UE may report, to the network device by using the third indication information and the fourth indication information, that a carrier aggregation capability of the UE includes that both the downlink carriers in the different radio access technologies and the uplink carriers in the different radio access technologies are contiguous. Therefore, the network device may allocate the appropriate communication resource to the UE based on the received UE capability information, to improve communication quality.

According to a fourth aspect, an embodiment of this application provides a method for reporting user equipment (UE) capability information. The method includes: sending, by a network device, UE capability enquiry information to a UE, where the UE supports a plurality of different radio access technologies, and the UE capability enquiry information is used to enquire a capability of the UE; and receiving, by the network device, UE capability information from the UE, where the UE capability information includes third indication information and fourth indication information, the third indication information indicates whether downlink carriers in the different radio access technologies are contiguous, and the fourth indication information indicates whether uplink carriers in the different radio access technologies are contiguous.

According to the technical solution provided in the fourth aspect, the network device may send the UE capability enquiry information to the UE, and receive the UE capability information, so that the network device determines, based on the third indication information and the fourth indication information that are included in the UE capability information, a contiguous manner of the uplink carriers in the different radio access technologies and a contiguous manner of the downlink carriers in the different radio access technologies that are supported by the UE, and allocates an appropriate communication resource to the user equipment.

With reference to the fourth aspect, in a first possible implementation, when the UE capability information does not include a third field, the third indication information indicates that the downlink carriers in the different radio access technologies are contiguous; the UE capability information includes a fourth field, and the fourth field carries a value of the fourth indication information; and when the value of the fourth indication information is a fifth state value, the fourth indication information indicates that the uplink carriers in the different radio access technologies are non-contiguous. Based on the first possible implementation of the fourth aspect, the network device may determine, based on the third indication information and the fourth indication information, that a carrier aggregation capability of the UE includes that the downlink carriers in the different radio access technologies are contiguous and the uplink carriers in the different radio access technologies are non-contiguous, so that the network device can allocate the appropriate communication resource to the UE based on the carrier aggregation capability of the UE, to improve communication quality.

With reference to the fourth aspect, in a second possible implementation, the UE capability information includes a third field and a fourth field, the third field carries a value of the third indication information, and the fourth field carries a value of the fourth indication information. Based on the second possible implementation of the fourth aspect, the network device may determine, based on the third indication information and the fourth indication information, that a carrier aggregation capability of the UE includes that the downlink carriers in the different radio access technologies are contiguous and the uplink carriers in the different radio access technologies are non-contiguous, that neither the downlink carriers in the different radio access technologies nor the uplink carriers in the different radio access technologies are contiguous, and that neither the downlink carriers in the different radio access technologies nor the uplink carriers in the different radio access technologies are contiguous and both the downlink carriers in the different radio access technologies and the uplink carriers in the different radio access technologies are contiguous, so that the network device can allocate the appropriate communication resource to the UE based on the carrier aggregation capability of the UE, to improve communication quality.

With reference to the fourth aspect, in a third possible implementation, when the UE capability information does not include a third field and a fourth field, the third indication information indicates that the downlink carriers in the different radio access technologies are contiguous, and the fourth indication information indicates that the uplink carriers in the different radio access technologies are contiguous. Based on the third possible implementation of the fourth aspect, the network device may determine, based on the third indication information and the fourth indication information, that a carrier aggregation capability of the UE includes that the downlink carriers in the different radio access technologies are contiguous and the uplink carriers in the different radio access technologies are contiguous, so that the network device can allocate the appropriate communication resource to the UE based on the carrier aggregation capability of the UE, to improve communication quality.

According to a fifth aspect, an embodiment of this application provides a user equipment. The user equipment has a function of implementing the method according to the first aspect. The function may be implemented by hardware, or may be implemented by hardware executing corresponding software. The hardware or the software includes one or more modules or processors corresponding to the foregoing function.

According to a sixth aspect, an embodiment of this application provides a network device. The network device has a function of implementing the method according to the second aspect. The function may be implemented by hardware, or may be implemented by hardware executing corresponding software. The hardware or the software includes one or more modules or processors corresponding to the foregoing function.

According to a seventh aspect, an embodiment of this application provides a user equipment. The user equipment has a function of implementing the method according to the third aspect. The function may be implemented by hardware, or may be implemented by hardware executing corresponding software. The hardware or the software includes one or more modules or processors corresponding to the foregoing function.

According to an eighth aspect, an embodiment of this application provides a network device. The network device has a function of implementing the method according to the fourth aspect. The function may be implemented by hardware, or may be implemented by hardware executing corresponding software. The hardware or the software includes one or more modules or processors corresponding to the foregoing function.

According to a ninth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the method for reporting UE capability information according to the first aspect and the possible implementations of the first aspect is implemented.

According to a tenth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the method for reporting UE capability information according to the second aspect and the possible implementations of the second aspect is implemented.

According to an eleventh aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the method for reporting UE capability information according to the third aspect and the possible implementations of the third aspect is implemented.

According to a twelfth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the method for reporting UE capability information according to the fourth aspect and the possible implementations of the fourth aspect is implemented.

According to a thirteenth aspect, this application provides a system chip. The system chip may be used in a communication apparatus. The system chip includes at least one processor. Related program instructions are executed by the at least one processor, to implement a function of the user equipment in the method in the first aspect and any design of the method in the first aspect. Optionally, the system chip may further include at least one memory. The memory stores the related program instructions.

According to a fourteenth aspect, this application provides a system chip. The system chip may be used in a communication apparatus. The system chip includes at least one processor. Related program instructions are executed by the at least one processor, to implement a function of the network device in the method in the second aspect and any design of the method in the second aspect. Optionally, the system chip may further include at least one memory. The memory stores the related program instructions.

According to a fifteenth aspect, this application provides a system chip. The system chip may be used in a communication apparatus. The system chip includes at least one processor. Related program instructions are executed by the at least one processor, to implement a function of the user equipment in the method in the third aspect and any design of the method in the third aspect. Optionally, the system chip may further include at least one memory. The memory stores the related program instructions.

According to a sixteenth aspect, this application provides a system chip. The system chip may be used in a communication apparatus. The system chip includes at least one processor. Related program instructions are executed by the at least one processor, to implement a function of the network device in the method in the fourth aspect and any design of the method in the fourth aspect. Optionally, the system chip may further include at least one memory. The memory stores the related program instructions.

According to a seventeenth aspect, an embodiment of this application provides a computer-readable storage medium such as a non-transitory computer-readable storage medium. The computer-readable storage medium stores a computer program. When the computer program is run on a computer, the computer is enabled to perform any possible method in the first aspect. For example, the computer may be at least one storage node.

According to an eighteenth aspect, an embodiment of this application provides a computer-readable storage medium such as a non-transitory computer-readable storage medium. The computer-readable storage medium stores a computer program. When the computer program is run on a computer, the computer is enabled to perform any possible method in the second aspect. For example, the computer may be at least one storage node.

According to a nineteenth aspect, an embodiment of this application provides a computer-readable storage medium such as a non-transitory computer-readable storage medium. The computer-readable storage medium stores a computer program. When the computer program is run on a computer, the computer is enabled to perform any possible method in the third aspect. For example, the computer may be at least one storage node.

According to a twentieth aspect, an embodiment of this application provides a computer-readable storage medium such as a non-transitory computer-readable storage medium. The computer-readable storage medium stores a computer program. When the computer program is run on a computer, the computer is enabled to perform any possible method in the fourth aspect. For example, the computer may be at least one storage node.

According to a twenty-first aspect, an embodiment of this application provides a computer program product. When the computer program product runs on a computer, any method provided in the first aspect is enabled to be performed. For example, the computer may be at least one storage node.

According to a twenty-second aspect, an embodiment of this application provides a computer program product. When the computer program product runs on a computer, any method provided in the second aspect is enabled to be performed. For example, the computer may be at least one storage node.

According to a twenty-third aspect, an embodiment of this application provides a computer program product. When the computer program product runs on a computer, any method provided in the third aspect is enabled to be performed. For example, the computer may be at least one storage node.

According to a twenty-fourth aspect, an embodiment of this application provides a computer program product. When the computer program product runs on a computer, any method provided in the fourth aspect is enabled to be performed. For example, the computer may be at least one storage node.

According to a twenty-fifth aspect, an embodiment of this application provides a communication system. The communication system may include any one or more of the following: the user equipment in the fifth aspect, the network device in the sixth aspect, the user equipment in the seventh aspect, the network device in the eighth aspect, the communication apparatus in the ninth aspect, the communication apparatus in the tenth aspect, the communication apparatus in the eleventh aspect, the communication apparatus in the twelfth aspect, the system chip in the thirteenth aspect, the system chip in the fourteenth aspect, the system chip in the fifteenth aspect, the system chip in the sixteenth aspect, the computer storage medium in the seventeenth aspect, the computer storage medium in the eighteenth aspect, the computer storage medium in the nineteenth aspect, the computer storage medium in the twentieth aspect, the computer program product in the twenty-first aspect, the computer program product in the twenty-second aspect, the computer program product in the twenty-third aspect, or the computer program product in the twenty-fourth aspect.

It may be understood that any user equipment, network device, communication apparatus, system chip, computer storage medium, computer program product, communication system, or the like provided above is configured to perform a corresponding method provided above. Therefore, for beneficial effects that can be achieved by any user equipment, network device, communication apparatus, system chip, computer storage medium, computer program product, communication system, or the like, refer to beneficial effects in the corresponding method. Details are not described herein again.

DESCRIPTION OF EMBODIMENTS

The following describes implementations of embodiments of this application in detail with reference to accompanying drawings.

Technical solutions provided in this application may be applied to various communication systems, such as a 5G communication system, a future evolved system, or a plurality of converged communication systems, or may be applied to an existing communication system or the like. Application scenarios of the technical solutions provided in this application may include a plurality of types, for example, machine to machine (M2M), macro-micro communication, enhanced mobile broadband (eMBB), ultra-reliable and low-latency communication (URLLC), and massive machine-type communications (mMTC). These application scenarios may include but are not limited to: a scenario of communication between user equipment, a scenario of communication between network devices, a scenario of communication between a network device and a user equipment, and the like. The following provides descriptions by using an example in which the technical solutions are applied to the scenario of communication between the network device and the user equipment.

Figure 1:
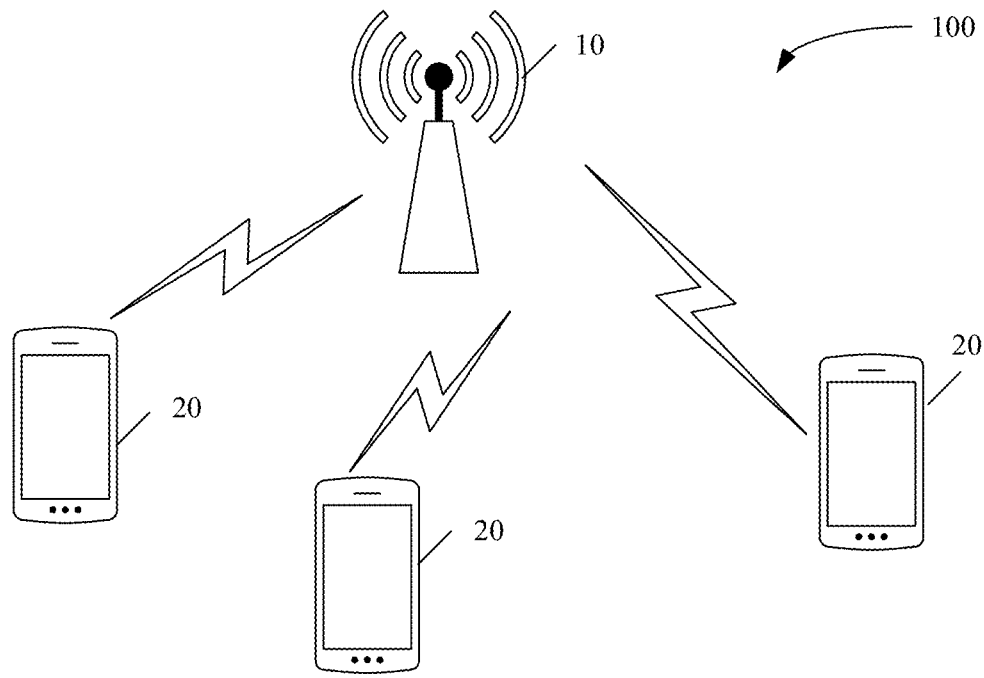
FIG. 1 is a schematic diagram of an architecture of a communication system according to an embodiment of this application.

FIG. 1 is a schematic diagram of an architecture of a communication system 100 according to an embodiment of this application. In FIG. 1, the communication system 100 may include one or more network devices 10 (only one network device is shown) and one or more user equipment 20 connected to each network device 10. FIG. 1 is merely a schematic diagram, and does not constitute a limitation on the scenarios to which the technical solutions provided in this application are applicable.

The network device 10 may be a transmission reception point (TRP), a base station, a relay station, an access point, or the like. The network device 10 may be a network device in a 5G communication system or a network device in a future evolved network, or may be a wearable device, a vehicle-mounted device, or the like. In addition, the network device 10 may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolved NodeB) in long term evolution (LTE). The network device 10 may alternatively be a radio controller in a cloud radio access network (CRAN) scenario.

The user equipment 20 may be an access terminal, a UE unit, a UE station, a mobile station, a remote station, a remote terminal, a mobile device, a UE terminal, a wireless communication device, a UE agent, a UE apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a UE in a 5G network, a UE in a future evolved public land mobile network (PLMN) network, or the like.

In the communication system 100 shown in FIG. 1, the user equipment 20 may support a plurality of different radio access technologies, for example, LTE, NR, GSM, and WCDMA. The following provides descriptions by using an example in which the user equipment 20 supports LTE and NR. For a case in which the user equipment 20 supports another communication standard, refer to the corresponding descriptions of a case in which the user equipment 20 supports LTE and NR. Details are not described again.

After an initial connection is established between the user equipment 20 and the network device 10, the network device 10 may enquire a capability of the UE by sending UE capability enquiry information to the user equipment. After receiving the UE capability enquiry information, the user equipment 20 may report the capability of the UE by sending UE capability information to the network device 10.

The capability of the UE may include physical-parameters (Phy-parameters), radio frequency-parameters (RF-parameters), packet data convergence protocol-parameters (PDCP-parameters), radio link control-parameters (RLC-parameters), medium access control-parameters (MAC-parameters), and the like of the UE.

The RF-parameters of the UE may include a support band combination list of the UE, the band combination list may include a support band combination (supportBandCombination) of the UE, and the UE may perform normal service work on the support band combination of the UE included in the band combination list.

The supportBandCombination may include a band list (bandList) and carrier aggregation parameters (caParameters) of the bandList. The band list may include one or more bands. The carrier aggregation parameters of the bandList represent correlation capability parameters of carrier aggregation, for example, whether uplink concurrency and downlink concurrency can be implemented.

For example, the RF-parameters may include the supportBandCombinationList, and the supportBandCombinationList may include a supportBandCombination 1, a supportBandCombination 2, and the like, where the supportBandCombination 1 may include a bandList and caParameters of the bandList, and the bandList may include a band 1, a band 2, and the like.

If the user equipment 20 can support the 5G network, band combinations (BandCombination) may be classified into two types based on standard types of bands. A first type is an ENDC-band combination (Endc-BandCombination), that is, the band combination includes an LTE band (Lte-Band) and an NR band (NrBand) (for example, a BandCombination including an LteBand 3 and an NrBand 41 may be represented as BC_3+n41). A second type is an NR carrier aggregation-band combination (NrCa-BandCombination), and the band combination includes only NrBands (for example, a BandCombination including an NrBand 41 and an NrBand 78 may be represented as BC_n41+n78).

Endc-BandCombinations may be classified into two types depending on whether identifiers of the LteBand and the NrBand that are included in each of the Endc-BandCombination are the same. A first type is an intra-band-ENDC-band combination (intra-band-Endc-BandCombination), that is, the identifiers of the LteBand and the NrBand that are included in the Endc-BandCombination are the same (for example, a BandCombination including an LteBand 41 and the NrBand 41 may be represented as BC_41+n41). A second type is an inter-band-ENDC-band combination (inter-band-Endc-BandCombination), that is, the identifiers of the LteBand and the NrBand that are included in the Endc-BandCombination are different (for example, the BandCombination including the LteBand 3 and the NrBand 41 may be represented as BC_3+n41).

Intra-band-Endc-BandCombinations may be classified into the following three types depending on whether aggregated carriers are contiguous in frequency domain.

Type 1: Neither uplink carriers in the different radio access technologies nor downlink carriers in the different radio access technologies are contiguous in frequency domain.

Figure 2A:
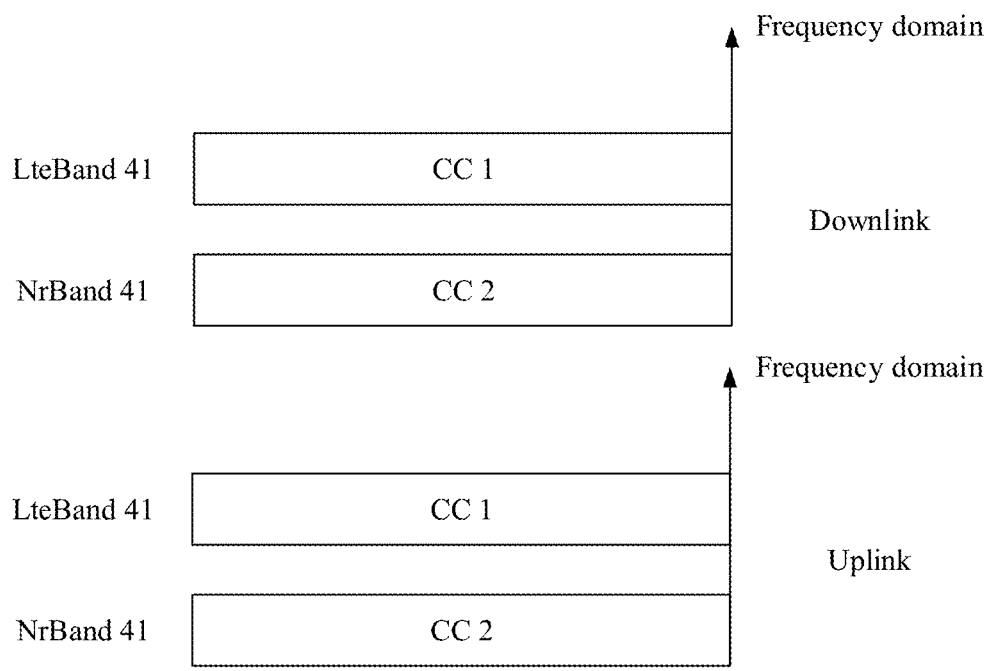
FIG. 2(a) is a schematic diagram 1 of a frequency domain position according to an embodiment of this application.

For example, the BandCombination includes the LteBand 41 and the NrBand 41, and the BandCombination may be represented as BC_41+n41. FIG. 2(a) is a schematic diagram of a frequency domain position of BC_41+n41. There is a carrier CCs 1 on the LteBand 41, and there is a carrier CCs 2 on the NrBand 41. In the figure, a downlink carrier on the LteBand 41 and a downlink carrier on the NrBand 41 are non-contiguous in frequency domain, and an uplink carrier on the LteBand 41 and an uplink carrier on the NrBand 41 are non-contiguous in frequency domain either.

Type 2: Both uplink carriers in the different radio access technologies and downlink carriers in the different radio access technologies are contiguous in frequency domain.

Figure 2B:
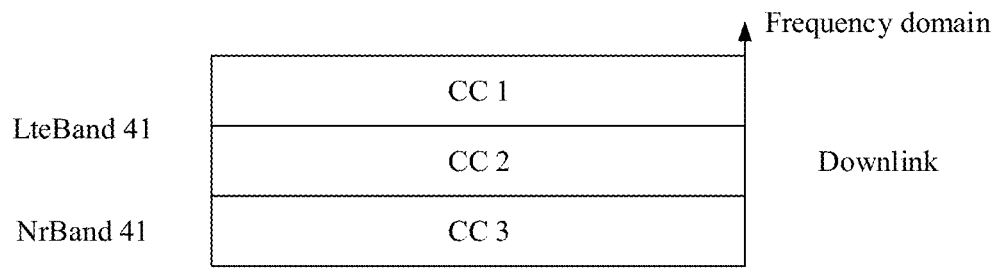
FIG. 2(b) is a schematic diagram 2 of a frequency domain position according to an embodiment of this application.
Figure 2B:
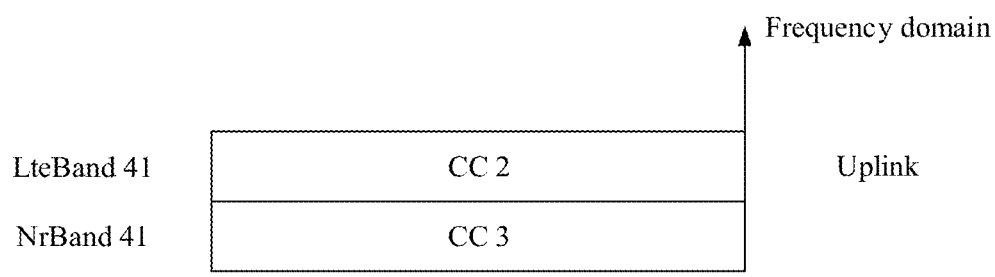

For example, the BandCombination includes the LteBand 41 and the NrBand 41, and the BandCombination may be represented as BC_41+n41. FIG. 2(b) is a schematic diagram of a frequency domain position of BC_41+n41. There are two downlink carriers CCs 1 and CCs 2 and a uplink carrier CCs 2 on the LteBand 41, and there is a carrier CCs 3 on the NrBand 41. In the figure, the downlink carriers on the LteBand 41 and a downlink carrier on the NrBand 41 are contiguous in frequency domain, and the uplink carrier on the LteBand 41 and an uplink carrier on the NrBand 41 are also contiguous in frequency domain.

Figure 2C:
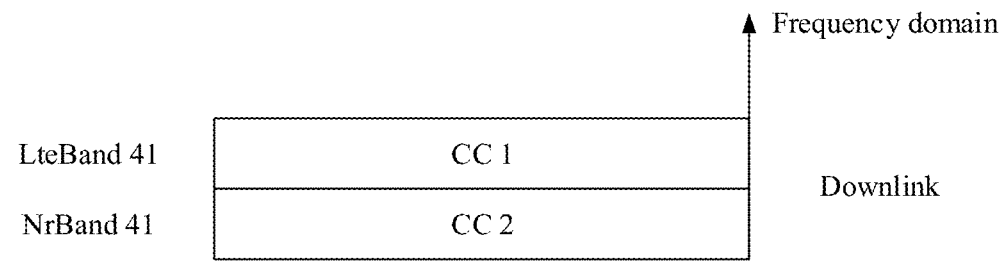
FIG. 2(c) is a schematic diagram 3 of a frequency domain position according to an embodiment of this application.
Figure 2C:
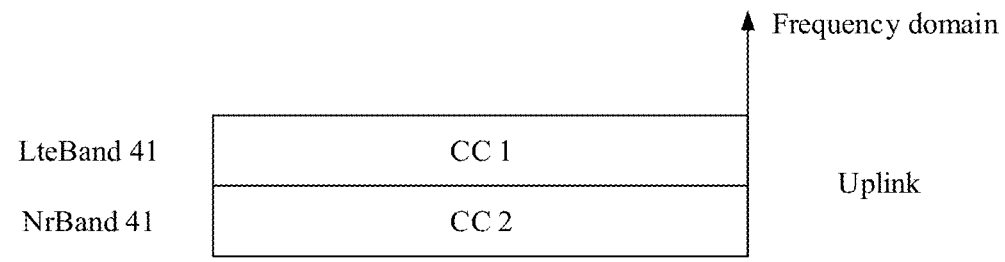

For example, the BandCombination includes the LteBand 41 and the NrBand 41, and the BandCombination may be represented as BC_41+n41. FIG. 2(c) is a schematic diagram of a frequency domain position of BC_41+n41. There is a carrier CCs 1 on the LteBand 41, and there is a carrier CCs 2 on the NrBand 41. In the figure, a downlink carrier on the LteBand 41 and a downlink carrier on the NrBand 41 are contiguous in frequency domain, and an uplink carrier on the LteBand 41 and an uplink carrier on the NrBand 41 are also contiguous in frequency domain.

Type 3: Downlink carriers in the different radio access technologies are contiguous in frequency domain, and uplink carriers in the different radio access technologies are non-contiguous in frequency domain.

Figure 2D:
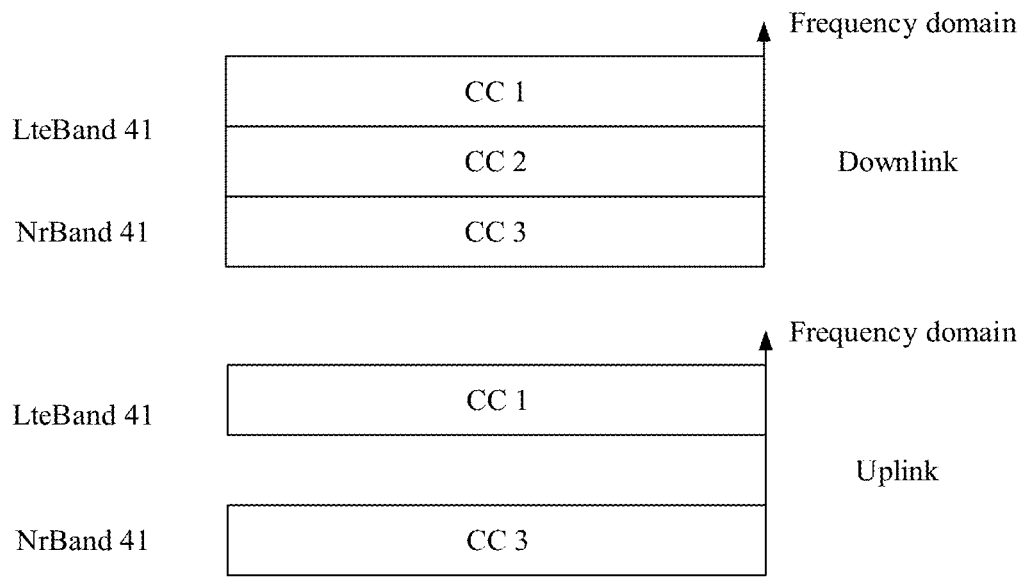
FIG. 2(d) is a schematic diagram 4 of a frequency domain position according to an embodiment of this application.

For example, the BandCombination includes the LteBand 41 and the NrBand 41, and the BandCombination may be represented as BC_41+n41. FIG. 2(d) is a schematic diagram of a frequency domain position of BC_41+n41. There are two downlink carriers CCs 1 and CCs 2 and a uplink carrier CCs 1 on the LteBand 41, and there is a carrier CCs 3 on the NrBand 41. In the figure, the downlink carriers on the LteBand 41 and a downlink carrier on the NrBand 41 are contiguous in frequency domain, and the uplink carrier on the LteBand 41 and an uplink carrier on the NrBand 41 are non-contiguous in frequency domain.

In a conventional technology, the user equipment 20 reports a capability (namely, a type of the intra-band-Endc-BandCombination supported by the user equipment) of the intra-band-Endc-BandCombination to the network device 10 by using a capability item intraBandENDC-Support-v1540 corresponding to the BandCombination.

intraBandENDC-Support-v1540 is an optional field.

The user equipment 20 may report the capability of the intra-band-Endc-BandCombination to the network device 10 in the following manners.

Manner 1: The user equipment 20 does not report intraBandENDC-Support-v1540, that is, the user equipment capability information does not include intraBandENDC-Support-v1540. It may indicate that the user equipment 20 supports a case in which both uplink carriers and downlink carriers are contiguous in frequency domain (that is, a case of the foregoing type 2).

Manner 2: The user equipment 20 reports intraBandENDC-Support-v1540, and an enumerated value of intraBandENDC-Support-v1540 is non-contiguous. It may indicate that the user equipment 20 supports a case in which neither uplink carriers nor downlink carriers are contiguous in frequency domain (that is, a case of the foregoing type 1).

Manner 3: The user equipment 20 reports intraBandENDC-Support-v1540, and an enumerated value of intraBandENDC-Support-v1540 is both. It may indicate that the user equipment 20 supports a case in which neither uplink carriers nor downlink carriers are contiguous in frequency domain and a case in which both uplink carriers and downlink carriers are contiguous in frequency domain (that is, cases of the foregoing type 1 and type 2).

It can be learned from the foregoing descriptions that the user equipment 20 may report, to the network device 10 by using the field intraBandENDC-Support-v1540 in the conventional technology, only a capability corresponding to the type 1 and/or a capability corresponding to the type 2, and the user equipment 20 cannot report, to the network device 10 by using intraBandENDC-Support-v1540, a capability corresponding to the type 3. Therefore, for a user equipment 20 supporting the type 3, the network device 10 cannot allocate, to the user equipment 20, a frequency domain resource of non-contiguous uplink carriers and contiguous downlink carriers.

To resolve a conventional-technology problem that the user equipment 20 cannot report the type 3 to the network device 10, the embodiments of this application provide a method for reporting UE capability information. In the embodiments of this application, the user equipment 20 may report a case of the type 3 through mutual cooperation between a newly added field and the field intraBandENDC-Support-v1540, or the user equipment 20 may report a case of the type 3 by using a newly added field. For a specific process of the method for reporting UE capability information, refer to the descriptions in an embodiment corresponding to the method shown in FIG. 4. According to the method, the user equipment 20 may report, to the network device 10, whether the uplink carriers in the different radio access technologies are contiguous and whether the downlink carriers in the different radio access technologies are contiguous, so that the network device 10 allocates an appropriate resource to the user equipment 20.

In a specific implementation, each network element (for example, the network device 10 and the user equipment 20) in FIG. 1 may be implemented by one device, or may be a function module in a device. This is not specifically limited in this embodiment of this application. It may be understood that the foregoing functions may be network elements in a hardware device, may be software functions running on dedicated hardware, or may be virtualization functions instantiated on a platform (for example, a cloud platform).

Figure 3:
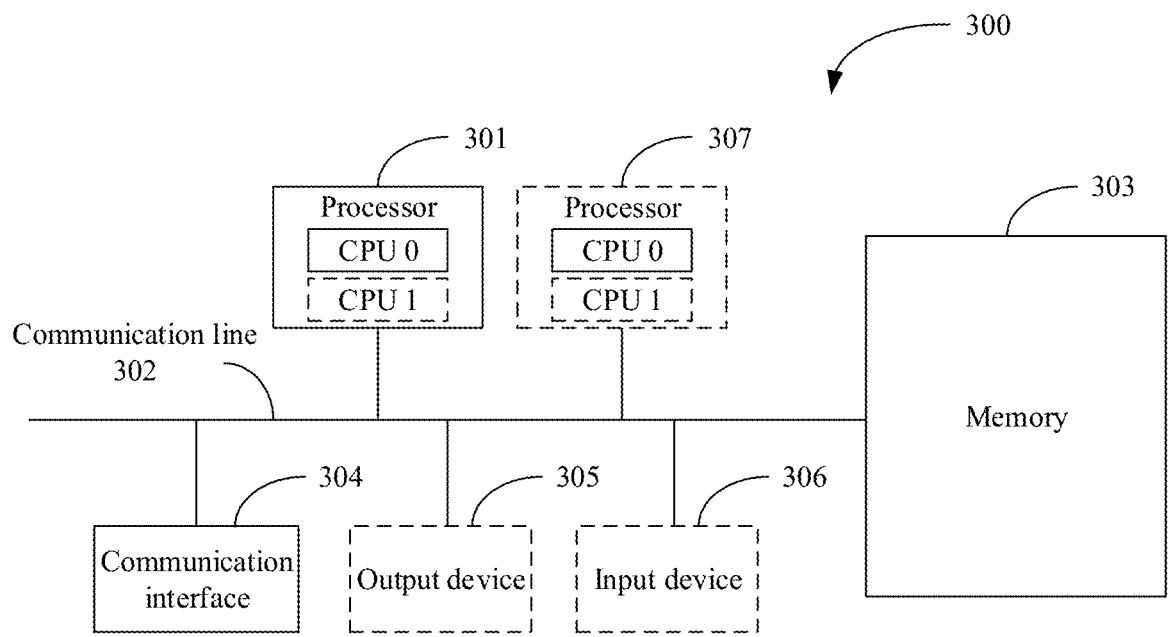
FIG. 3 is a schematic diagram of a hardware structure of a communication device according to an embodiment of this application.

For example, each network element in FIG. 1 may be implemented by using a communication device 300 in FIG. 3. FIG. 3 is a schematic diagram of a hardware structure of a communication device to which an embodiment of this application is applicable. The communication device 300 may include at least one processor 301, a communication line 302, a memory 303, and at least one communication interface 304.

The processor 301 may be a general purpose central processing unit (CPU), a microprocessor, an application-specific integrated circuit (ASIC), or one or more integrated circuits configured to control program execution of the solutions in this application.

The communication line 302 may include a path for transferring information between the foregoing components, for example, a bus.

The communication interface 304 uses any apparatus such as a transceiver, to communicate with another device or a communication network, for example, an Ethernet interface, a radio access network (RAN) interface, or a wireless local area network (WLAN) interface.

The memory 303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory may exist independently, and be connected to the processor through the communication line 302. The memory may alternatively be integrated with the processor. The memory provided in this embodiment of this application may usually be non-volatile. The memory 303 is configured to store computer-executable instructions for executing the solutions in this application, and the processor 301 controls execution. The processor 301 is configured to execute the computer-executable instructions stored in the memory 303, to implement the method provided in the embodiments of this application.

Optionally, the computer-executable instructions in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the communication device 300 may include a plurality of processors, for example, the processor 301 and a processor 307 in FIG. 3. Each of the processors may be a single-core (single-CPU) processor or a multi-core (multi-CPU) processor. The processor herein may refer to one or more devices, circuits, and/or processing cores configured to process data (for example, computer program instructions).

In a specific implementation, in some embodiments, the communication device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, or a sensor device.

In a specific implementation, the communication device 300 may be a network server, a personal digital assistant (PDA), a mobile phone, a tablet computer, a wireless terminal device, an embedded device, or a device having a structure similar to that in FIG. 3. A type of the communication device 300 is not limited in this embodiment of this application.

The method for reporting UE capability information provided in the embodiments of this application is described below with reference to FIG. 1 and FIG. 3.

It should be noted that the names of messages between the network elements, the names of parameters in the messages, or the like in the following embodiments of this application are merely examples, and other names may be used during specific implementation. This is not limited in the embodiments of this application.

It may be understood that, in the embodiments of this application, a user equipment or a network device may perform some or all of steps in the embodiments of this application. The steps are merely examples. In the embodiments of this application, other steps or variations of various steps may be further performed. In addition, the steps may be performed in a sequence different from a sequence presented in the embodiments of this application, and not all steps in the embodiments of this application may need to be performed.

Figure 4:
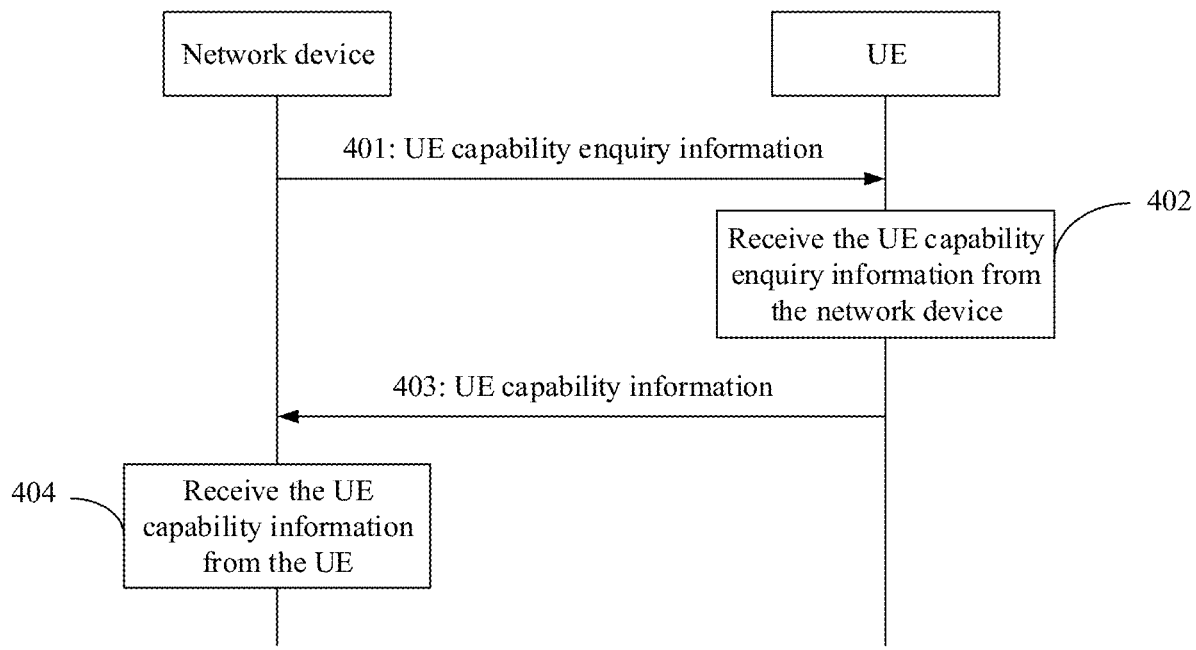
FIG. 4 is a schematic flowchart 1 of a method for reporting UE capability information according to an embodiment of this application.

FIG. 4 shows a method for reporting UE capability information according to an embodiment of this application. The method may include step 401 to step 404.

Step 401: A network device sends UE capability enquiry information to a UE.

The network device may be the network device 10 in FIG. 1, the UE may be the user equipment 20 in FIG. 1, and the UE may support a plurality of different radio access technologies.

The UE capability enquiry information may be signaling UECapabilityEnquiry. The signaling UECapabilityEnquiry may be used to enquire a capability of the UE. The capability of the UE may include a carrier aggregation capability of the UE (for example, an intra-band-Endc-BandCombination supported by the UE), and may further include Phy-Parameters, PDCP-Parameters, RLC-Parameters, MAC-Parameters, and the like. In this embodiment of this application, enquiring the carrier aggregation capability supported by the UE is used as an example for description.

For example, that a network device sends UE capability enquiry information to a UE includes: The network device sends radio resource control (RRC) signaling to the UE, where the RRC signaling includes the UE capability enquiry information.

Step 402: The UE receives the UE capability enquiry information from the network device.

For example, that the UE receives the UE capability enquiry information from the network device may include: The UE receives the RRC signaling from the network device, where the RRC signaling includes the UE capability enquiry information; and the UE obtains the UE capability enquiry information from the RRC signaling after receiving the RRC signaling.

Step 403: The UE sends UE capability information to the network device based on the UE capability enquiry information.

The UE capability information may be signaling UECapabilityInformation, the signaling UECapabilityInformation may be used to indicate the capability of the UE, and the capability of the UE may include the carrier aggregation capability of the UE.

The capability of the UE may be preset and configured by a vendor on the UE.

For example, that the UE sends UE capability information to the network device based on the UE capability enquiry information may include: The UE capability enquiry information is a trigger condition for the UE to send the UE capability information to the network device, and once the UE receives the UE capability enquiry information sent by the network device, the UE queries the capability of the UE configured on the UE, and sends the found capability of the UE to the network device.

In this embodiment of this application, the carrier aggregation capability of the UE may be indicated depending on whether the UE capability information carries a newly added field and/or an original field intraBandENDC-Support-v1540. Examples are as follows.

In some embodiments, the carrier aggregation capability may include whether uplink carriers in different radio access technologies are contiguous and whether downlink carriers in the different radio access technologies are contiguous. The UE capability information may include third indication information and fourth indication information. The third indication information is different from the fourth indication information. The third indication information indicates whether the downlink carriers in the different radio access technologies are contiguous, and the fourth indication information indicates whether the uplink carriers in the different radio access technologies are contiguous. In this way, different indication information in the UE capability information may be used to separately indicate whether the uplink carriers in the different radio access technologies are contiguous and whether the downlink carriers in the different radio access technologies are contiguous.

The third indication information may indicate, depending on whether the UE capability information includes a third field, whether the downlink carriers in the different radio access technologies are contiguous, where the third field may be intraBandENDC-Support-v1540. The fourth indication information may indicate, depending on whether the UE capability information includes a fourth field, whether the uplink carriers in the different radio access technologies are contiguous, where the fourth field may be the newly added field.

Specifically, for descriptions of various indication manners of separately indicating the carrier aggregation capability of the UE by using the different indication information in the UE capability information, refer to the descriptions in a second implementation scenario of the embodiment shown in FIG. 4.

In some embodiments, the carrier aggregation capability of the UE may include that the downlink carriers in the different radio access technologies are contiguous and the uplink carriers in the different radio access technologies are non-contiguous. A field may be newly added to the UE capability information, and the newly added field may be used to indicate that the downlink carriers in the different radio access technologies are contiguous and the uplink carriers in the different radio access technologies are non-contiguous.

In this embodiment, the UE capability information may further include the original field intraBandENDC-Support-v1540 in addition to the newly added field. The original field intraBandENDC-Support-v1540 indicates that both the uplink carriers in the different radio access technologies and the downlink carriers in the different radio access technologies are contiguous and/or that neither the uplink carriers in the different radio access technologies nor the downlink carriers in the different radio access technologies are contiguous.

When a quantity of the uplink carriers in the different radio access technologies is less than a quantity of the downlink carriers in the different radio access technologies in a band, the newly added field is valid, and the field intraBandENDC-Support-v1540 is invalid. In this case, the carrier aggregation capability of the UE may be determined depending only on whether the UE capability information includes the newly added field: The downlink carriers in the different radio access technologies are contiguous and the uplink carriers in the different radio access technologies are non-contiguous, and/or both the uplink carriers in the different radio access technologies and the downlink carriers in the different radio access technologies are contiguous. Regardless of whether the UE capability information includes the field intraBandENDC-Support-v1540, the carrier aggregation capability of the UE is not indicated based on the field intraBandENDC-Support-v1540.

Specifically, for descriptions of a specific process of indicating the carrier aggregation capability of the UE by using the newly added field, refer to the descriptions in a third implementation scenario of the embodiment shown in FIG. 4.

In still some embodiments, the carrier aggregation capability of the UE may include that the downlink carriers in the different radio access technologies are contiguous and the uplink carriers in the different radio access technologies are non-contiguous. A field may be newly added to the UE capability information, and the newly added field may be used to indicate that the downlink carriers in the different radio access technologies are contiguous and the uplink carriers in the different radio access technologies are non-contiguous.

In this embodiment, the UE capability information may further carry the original field intraBandENDC-Support-v1540 in addition to the newly added field. The newly added field may further be used to indicate whether the field intraBandENDC-Support-v1540 is valid. When the field intraBandENDC-Support-v1540 is valid, the field intraBandENDC-Support-v1540 indicates that both the uplink carriers in the different radio access technologies and the downlink carriers in the different radio access technologies are contiguous and/or that neither the uplink carriers in the different radio access technologies nor the downlink carriers in the different radio access technologies are contiguous.

Specifically, for a process of indicating the carrier aggregation capability of the UE in this embodiment, refer to the descriptions in a fourth implementation scenario of the embodiment shown in FIG. 4.

Step 404: The network device receives the UE capability information from the UE.

Based on the method shown in FIG. 4, the UE receives the UE capability enquiry information sent by the network device, and may send the UE capability information to the network device based on the UE capability enquiry information. The UE capability information may separately indicate, by using the different indication information, whether the uplink carriers in the different radio access technologies are contiguous and whether the downlink carriers in the different radio access technologies are contiguous. Or the UE capability information may indicate, by using the newly added field, that the downlink carriers in the different radio access technologies are contiguous and the uplink carriers in the different radio access technologies are non-contiguous, so that the network device allocates an appropriate resource to the UE based on the UE capability information.

Figure 5:
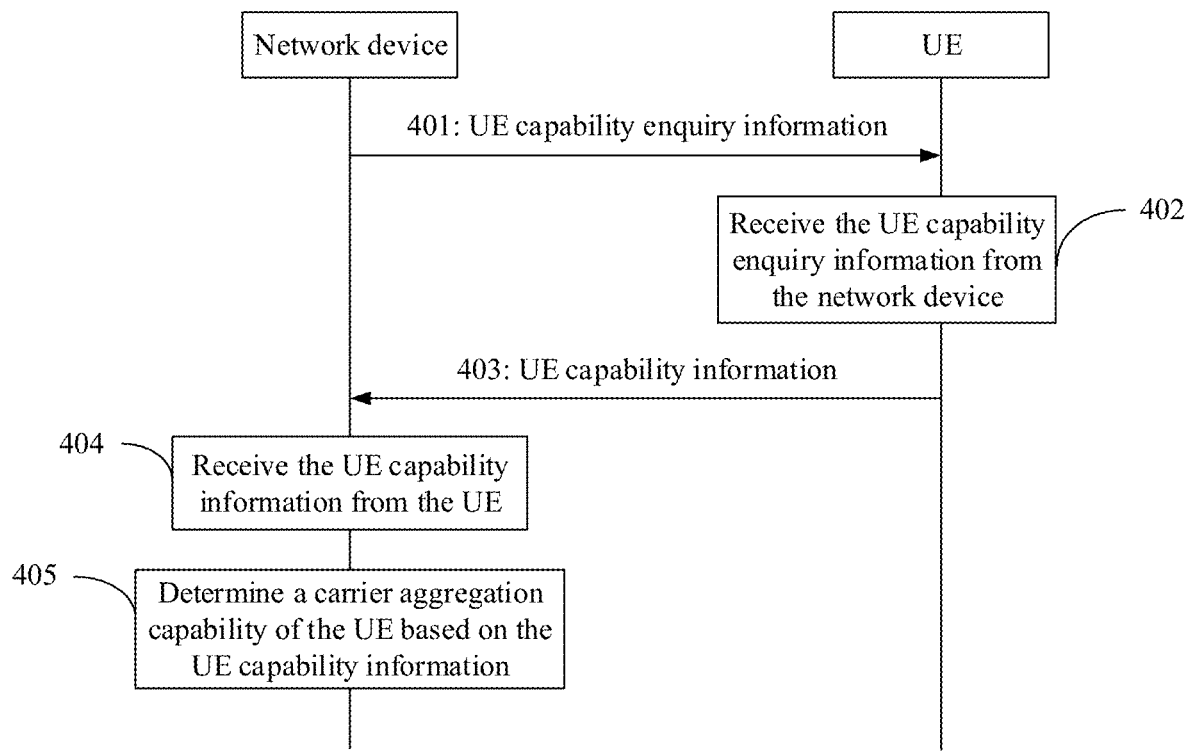
FIG. 5 is a schematic flowchart 2 of a method for reporting UE capability information according to an embodiment of this application.

Optionally, in a first implementation scenario of the embodiment shown in FIG. 4, as shown in FIG. 5, the method shown in FIG. 4 further includes step 405.

Step 405: The network device determines the carrier aggregation capability of the UE based on the UE capability information.

In an example in which the UE capability information includes the third indication information and the fourth indication information, the third indication information indicates whether the downlink carriers in the different radio access technologies are contiguous, and the fourth indication information indicates whether the uplink carriers in the different radio access technologies are contiguous. The network device receives the UE capability information from the UE, and may determine, depending on whether the UE capability information includes the third field, whether the downlink carriers in the different radio access technologies are contiguous, and determine, depending on whether the UE capability information includes the fourth field, whether the uplink carriers in the different radio access technologies are contiguous.

Optionally, after determining the carrier aggregation capability of the UE, the network device allocates an appropriate communication resource to the UE based on the carrier aggregation capability of the UE.

For example, the network device determines that the carrier aggregation capability of the UE is that neither the uplink carriers in the different radio access technologies nor the downlink carriers in the different radio access technologies are contiguous, and the network device may allocate non-contiguous frequency domain resources between the uplink carriers of the UE in the different radio access technologies and the downlink carriers of the UE in the different radio access technologies.

For another example, the network device determines that the carrier aggregation capability of the UE is that the uplink carriers in the different radio access technologies are non-contiguous and the downlink carriers in the different radio access technologies are contiguous, the network device may allocate non-contiguous frequency domain resources between the uplink carriers of the UE in the different radio access technologies, and allocate contiguous frequency domain resources between the downlink carriers of the UE in the different radio access technologies.

Based on the method shown in FIG. 5, after receiving the UE capability information, the network device may determine the carrier aggregation capability of the UE based on the UE capability information, so that the network device allocates the appropriate resource to the UE based on the UE capability information.

Optionally, in the second implementation scenario of the embodiment shown in FIG. 4, the UE capability information includes the third indication information and the fourth indication information. The third indication information indicates whether the downlink carriers in the different radio access technologies are contiguous, and the fourth indication information indicates whether the uplink carriers in the different radio access technologies are contiguous.

The third indication information may be explicitly or implicitly indicated depending on whether the UE capability information includes the third field.

If the UE capability information does not include the third field, the third indication information is implicitly indicated. By default, the third indication information indicates that the downlink carriers in the different radio access technologies are contiguous. If the UE capability information includes the third field, the third indication information is explicitly indicated. In this case, the third field may carry a value of the third indication information, and the value of the third indication information carried in the third field may be used to indicate whether the downlink carriers in the different radio access technologies are contiguous.

Optionally, the third field carries the value of the third indication information. When the value of the third indication information is a fifth state value, the third indication information indicates that the downlink carriers in the different radio access technologies are non-contiguous. When the value of the third indication information is a sixth state value, the third indication information indicates that the downlink carriers in the different radio access technologies are contiguous and that the downlink carriers in the different radio access technologies are non-contiguous.

For example, the third field may be intraBandENDC-Support-v1540. intraBandENDC-Support-v1540 is an optional field in the UE capability information. For example, intraBandENDC-Support-v1540 may or may not be included in the UE capability information. When intraBandENDC-Support-v1540 is included in the UE capability information, intraBandENDC-Support-v1540 has corresponding enumerated values, and the enumerated values may be "non-contiguous" or "both."

The enumerated value "non-contiguous" may be the fifth state value, and the enumerated value "both" may be the sixth state value. The following describes the third indication information by using an example in which the third field is intraBandENDC-Support-v1540.

(1) The UE capability information does not include intraBandENDC-Support-v1540, and the third indication information indicates that the downlink carriers in the different radio access technologies are contiguous.

(2) The UE capability information includes intraBandENDC-Support-v1540, an enumerated value of intraBandENDC-Support-v1540 is non-contiguous, and the third indication information may be used to indicate that the downlink carriers in the different radio access technologies are non-contiguous.

(3) The UE capability information includes intraBandENDC-Support-v1540, an enumerated value of intraBandENDC-Support-v1540 is both, and the third indication information may be used to indicate that the downlink carriers in the different radio access technologies are non-contiguous and that the downlink carriers in the different radio access technologies are contiguous.

Optionally, intraBandENDC-Support-v1540 is included in a substructure multi-radio access technology dual connectivity parameters (mrdc-Parameters) of the UECapabilityInformation.

For example, in the following code, DualPA-Architecture may be used to indicate a dual power amplification architecture. intraBandENDC-Support-v1540 may be used to indicate a contiguous manner of the downlink carriers in the different radio access technologies. When an enumerated value is "non-contiguous," intraBandENDC-Support-v1540 may be used to indicate that the downlink carriers in the different radio access technologies are non-contiguous. When an enumerated value is "both," intraBandENDC-Support-v1540 may be used to indicate that the downlink carriers in the different radio access technologies are non-contiguous and that the downlink carriers in the different radio access technologies are contiguous. ul-TimingAlignmentEUTRA-NR may be used to indicate that uplink sending time in EUTRA and NR is aligned.

```
MRDC-Parameters : := SEQUENCE{
...
[[
  DualPA-Architecture              ENUMERATED {supported}
OPTIONAL,
  intraBandENDC-Support-v1540 ENUMERATED {non-contiguous,both}
OPTIONAL,
  ul-TimingAlignmentEUTRA-NR       ENUMERATED {required}
OPTIONAL
]]
}
```

Similarly, the fourth indication information may be explicitly or implicitly indicated depending on whether the UE capability information includes the fourth field.

In a possible implementation, if the UE capability information does not include the fourth field, the fourth indication information is implicitly indicated. By default, the fourth indication information indicates that the uplink carriers in the different radio access technologies are contiguous. If the UE capability information includes the fourth field, the fourth indication information is explicitly indicated. In this case, the fourth field may carry a value of the fourth indication information, and the value of the fourth indication information carried in the fourth field may be used to indicate whether the uplink carriers in the different radio access technologies are contiguous.

Optionally, the fourth field carries the value of the fourth indication information. When the value of the fourth indication information is a fifth state value, the fourth indication information indicates that the uplink carriers in the different radio access technologies are non-contiguous. When the value of the fourth indication information is a sixth state value, the fourth indication information indicates that the uplink carriers in the different radio access technologies are contiguous and that the uplink carriers in the different radio access technologies are non-contiguous.

For example, the fourth field may be intra band ENDC uplink carrier contiguous manner indication information (intraBandENDCU1-Support). intraBandENDCU1-Support is an optional field in the UE capability information. For example, intraBandENDCU1-Support may or may not be included in the UE capability information. When intraBandENDCU1-Support is included in the UE capability information, intraBandENDCU1-Support has corresponding enumerated values, and the enumerated values may be "non-contiguous" and "both".

The enumerated value "non-contiguous" may be the fifth state value, and the enumerated value "both" may be the sixth state value. The following describes the fourth indication information by using an example in which the fourth field is intraBandENDCU1-Support.

(1) The UE capability information does not include intraBandENDCU1-Support, and the fourth indication information indicates that the uplink carriers in the different radio access technologies are contiguous.

(2) The UE capability information includes intraBandENDCU1-Support, an enumerated value of intraBandENDCU1-Support is "non-contiguous," and the fourth indication information may be used to indicate that the uplink carriers in the different radio access technologies are non-contiguous.

(3) The UE capability information includes intraBandENDCU1-Support, an enumerated value of intraBandENDCU1-Support is "both," and the fourth indication information may be used to indicate that the uplink carriers in the different radio access technologies are non-contiguous and that the uplink carriers in the different radio access technologies are contiguous.

Optionally, intraBandENDCU1-Support is included in a substructure mrdc-Parameters of UECapabilityInformation.

For example, in the following code, intraBandENDCU1-Support indicates a contiguous manner of the uplink carriers in the different radio access technologies. When an enumerated value of intraBandENDCU1-Support is "non-contiguous," intraBandENDCU1-Support may be used to indicate that the uplink carriers in the different radio access technologies are non-contiguous. When an enumerated value of intraBandENDCU1-Support is "both," intraBandENDCU1-Support may be used to indicate that the uplink carriers in the different radio access technologies are non-contiguous and that the uplink carriers in the different radio access technologies are contiguous. For descriptions of DualPA-Architecture, intraBandENDC-Support-v1540, and ul-TimingAlignmentEUTRA-NR, refer to the descriptions in the third indication information.

```
MRDC-Parameters : := SEQUENCE{
...
[[
  DualPA-Architecture              ENUMERATED {supported}
OPTIONAL,
  intraBandENDC-Support-v1540      ENUMERATED
                                   {non-contiguous,both}
OPTIONAL,
  ul-TimingAlignmentEUTRA-NR       ENUMERATED {required}
OPTIONAL
]]
[[
  intraBandENDCU1-Support          ENUMERATED
                                   {non-contiguous,both}
OPTIONAL
]]
}
```

In another possible implementation, if the UE capability information does not include the fourth field, the fourth indication information is implicitly indicated. By default, the fourth indication information indicates that a contiguous manner of the uplink carriers in the different radio access technologies is consistent with a contiguous manner that is of the uplink carriers in the different radio access technologies and that is indicated in intraBandENDC-Support-v1540 in a conventional technology. If the UE capability information includes the fourth field, the fourth indication information is explicitly indicated. In this case, the fourth field may carry a value of the fourth indication information, and the value of the fourth indication information carried in the fourth field may be used to indicate that a contiguous manner of the uplink carriers in the different radio access technologies is inconsistent with a contiguous manner that is of the uplink carriers in the different radio access technologies and that is indicated in intraBandENDC-Support-v1540 in a conventional technology.

Optionally, the fourth field carries the value of the fourth indication information. When the value of the fourth indication information is a fifth state value, the fourth indication information indicates that the contiguous manner of the uplink carriers in the different radio access technologies is inconsistent with the contiguous manner that is of the uplink carriers in the different radio access technologies and that is indicated in intraBandENDC-Support-v1540 in the conventional technology.

For example, the fourth field may be intra band ENDC uplink carrier contiguous manner indication information (intraBandENDCUl-Diff). intraBandENDCUl-Diff is an optional field in the UE capability information. For example, intraBandENDCUl-Diff may or may not be included in the UE capability information. When intraBandENDCUl-Diff is included in the UE capability information, intraBandEND-CUl-Diff has a corresponding enumerated value, and the enumerated value may be "different."

The enumerated value "different" may be the fifth state value. The following describes the fourth indication information by using an example in which the fourth field is intraBandENDCUl-Diff.

(1) The UE capability information does not include intra-BandENDCUl-Diff, and the fourth indication information indicates that the contiguous manner of the uplink carriers in the different radio access technologies is consistent with the contiguous manner that is of the uplink carriers in the different radio access technologies and that is indicated in intraBandENDC-Support-v1540 in the conventional technology.

(2) The UE capability information includes intraBandENDCUl-Diff, the enumerated value of intraBandEND-CUl-Diff is "different", and the fourth indication information may be used to indicate that the contiguous manner of the uplink carriers in the different radio access technologies is inconsistent with the contiguous manner that is of the uplink carriers in the different radio access technologies and that is indicated in intraBandENDC-Support-v1540 in the conventional technology.

Optionally, intraBandENDCUl-Diff is included in a substructure mrdc-Parameters of UECapabilityInformation.

For example, in the following code, the enumerated value of intraBandENDCUl-Diff is "different," and intraBandENDCUl-Diff may be used to indicate that the contiguous manner of the uplink carriers in the different radio access technologies is inconsistent with that indicated in intraBandENDC-Support-v1540 in the conventional technology. For descriptions of DualPA-Architecture, intraBandENDC-Support-v1540, and ul-TimingAlignmentEUTRA-NR, refer to the descriptions in the third indication information.

```
MRDC-Parameters : := SEQUENCE{
...
[[
DualPA-Architecture                ENUMERATED {supported}
OPTIONAL,
    intraBandENDC-Support-v1540 ENUMERATED {non-contiguous,both}
OPTIONAL,
    ul-TimingAlignmentEUTRA-NR     ENUMERATED {required}
OPTIONAL
]]
[[
    intraBandENDCUl-Diff           ENUMERATED {different}
OPTIONAL
]]
}
```

Based on the second implementation scenario of the embodiment shown in FIG. 4, the UE capability information may explicitly or implicitly indicate, by using the third indication information, whether the downlink carriers in the different radio access technologies are contiguous, and explicitly or implicitly indicate, by using the fourth indication information, whether the uplink carriers in the different radio access technologies are contiguous.

The following describes separate embodiments of indicating the UE capability information by using an example in which an indication manner of the third indication information is an implicit manner and an indication manner of the fourth indication information is an explicit manner, an example in which indication manners of the third indication information and the fourth indication information are both explicit manners, an example in which indication manners of the third indication information and the fourth indication information are both implicit manners, and an example in which an indication manner of the third indication information is an explicit manner and an indication manner of the fourth indication information is an implicit manner.

Case 1: The UE capability information does not include the third field, but includes the fourth field, where the fourth field carries the value of the fourth indication information, and the value of the fourth indication information is the fifth state value.

Optionally, the UE capability information does not include the third field, and the third indication information indicates that the downlink carriers in the different radio access technologies are contiguous. The UE capability information includes the fourth field, and the fourth field carries the value of the fourth indication information. When the value of the fourth indication information is the fifth state value, the fourth indication information indicates that the uplink carriers in the different radio access technologies are non-contiguous. The UE capability information indicates that the downlink carriers in the different radio access technologies are contiguous and the uplink carriers in the different radio access technologies are non-contiguous.

For example, the third field is intraBandENDC-Support-v1540, the fourth field is intraBandENDCUl-Support, and the fifth state value is non-contiguous (corresponding code is as follows). The third indication information may indicate that the downlink carriers in the different radio access technologies are contiguous, and the fourth indication information may indicate that the uplink carriers in the different radio access technologies are non-contiguous. Therefore, the UE capability information may indicate that the downlink carriers in the different radio access technologies are contiguous and the uplink carriers in the different radio access technologies are non-contiguous.

```
MRDC-Parameters : := SEQUENCE{
...
[[
intraB andENDCUl-Support    ENUMERATED {non-contiguous}
OPTIONAL
]]
}
```

For example, the third field is intraBandENDC-Support-v1540, the fourth field is intraBandENDCUl-Diff, and the fifth state value is "different" (corresponding code is as follows). The third indication information may indicate that the downlink carriers in the different radio access technologies are contiguous, and the fourth indication information may indicate that the contiguous manner of the uplink carriers in the different radio access technologies is inconsistent with that indicated in intraBandENDC-Support-v1540 in the conventional technology (in the conventional technology, the UE capability information does not include intraBandENDC-Support-v1540, and may indicate that both the uplink carriers in the different radio access technologies and the downlink carriers in the different radio access technologies are contiguous, and therefore, the fourth indication information may indicate that the uplink carriers in the different radio access technologies are non-contiguous). Therefore, the UE capability information may indicate that the downlink carriers in the different radio access technologies are contiguous and the uplink carriers in the different radio access technologies are non-contiguous.

```
MRDC-Parameters : := SEQUENCE{
...
[[
intraBandENDCUl-Diff    ENUMERATED {different}
OPTIONAL
]]
}
```

Optionally, the network device receives the UE capability information from the UE. The UE capability information does not include the third field, but includes the fourth field, the fourth field carries the value of the fourth indication information, and the value of the fourth indication information is the fifth state value. Based on this, the network device determines the carrier aggregation capability of the UE as follows: the downlink carriers in the different radio access technologies are contiguous, and the uplink carriers in the different radio access technologies are non-contiguous.

For example, the third field is intraBandENDC-Support-v1540, the fourth field is intraBandENDCUl-Support, and the fifth state value is non-contiguous. The network device receives the UE capability information from the UE. The UE capability information does not include the third field. Based on this, the network device determines that the UE supports a case in which the downlink carriers in the different radio access technologies are contiguous. The UE capability information includes the fourth field, the fourth field carries the value of the fourth indication information, and the value of the fourth indication information is "non-contiguous." Based on this, the network device determines that the UE supports a case in which the uplink carriers in the different radio access technologies are non-contiguous. Therefore, the network device may determine the carrier aggregation capability of the UE: The downlink carriers in the different radio access technologies are contiguous and the uplink carriers in the different radio access technologies are non-contiguous.

For example, the third field is intraBandENDC-Support-v1540, the fourth field is intraBandENDCUl-Diff, and the fifth state value is different. The network device receives the UE capability information from the UE. The UE capability information does not include the third field. Based on this, the network device determines that the UE supports a case in which the downlink carriers in the different radio access technologies are contiguous. The UE capability information includes the fourth field, the fourth field carries the value of the fourth indication information, and the value of the fourth indication information is "different." Based on this, the network device determines that the contiguous manner that is of the uplink carriers in the different radio access technologies and that is supported by the UE is inconsistent with that indicated in intraBandENDC-Support-v1540 in the conventional technology (in the conventional technology, the UE capability information does not include intraBandENDC-Support-v1540, and may indicate that both the uplink carriers in the different radio access technologies and the downlink carriers in the different radio access technologies are contiguous, and therefore, the network device determines that the UE supports a case in which the uplink carriers in the different radio access technologies are non-contiguous). Therefore, the network device may determine the carrier aggregation capability of the UE: The downlink carriers in the different radio access technologies are contiguous, and the uplink carriers in the different radio access technologies are non-contiguous.

Case 2: The UE capability information does not include the third field, but includes the fourth field, where the fourth field carries the value of the fourth indication information, and the value of the fourth indication information is the sixth state value.

Optionally, the UE capability information does not include the third field, and the third indication information indicates that the downlink carriers in the different radio access technologies are contiguous. The UE capability information includes the fourth field, and the fourth field carries the value of the fourth indication information. When the value of the fourth indication information is the sixth state value, the fourth indication information indicates that the uplink carriers in the different radio access technologies are non-contiguous and the uplink carriers in the different radio access technologies are contiguous. The UE capability information indicates that the downlink carriers in the different radio access technologies are contiguous and the uplink carriers in the different radio access technologies are non-contiguous and that both the downlink carriers in the different radio access technologies and the uplink carriers in the different radio access technologies are contiguous.

For example, the third field is intraBandENDC-Support-v1540, the fourth field is intraBandENDCUl-Support, and the sixth state value is "both" (corresponding code is as follows). The third indication information may indicate that the downlink carriers in the different radio access technologies are contiguous, and the fourth indication information may indicate that the uplink carriers in the different radio access technologies are non-contiguous and that the uplink carriers in the different radio access technologies are contiguous. Therefore, the UE capability information may indicate that the downlink carriers in the different radio access technologies are contiguous and the uplink carriers in the different radio access technologies are non-contiguous and that both the downlink carriers in the different radio access technologies and the uplink carriers in the different radio access technologies are contiguous.

```
MRDC-Parameters : := SEQUENCE{
...
[[
intraBandENDCU1-Support    ENUMERATED {both} OPTIONAL
]]
}
```

Optionally, the network device receives the UE capability information from the UE. The UE capability information does not include the third field, the UE capability information includes the fourth field, the fourth field carries the value of the fourth indication information, and the value of the fourth indication information is the sixth state value. Based on this, the network device determines the carrier aggregation capability of the UE as supporting: that the downlink carriers in the different radio access technologies are contiguous and the uplink carriers in the different radio access technologies are contiguous are non-contiguous, and both the downlink carriers in the different radio access technologies and the uplink carriers in the different radio access technologies are contiguous.

For example, the third field is intraBandENDC-Support-v1540, the fourth field is intraBandENDCU1-Support, and the sixth state value is "both." The network device receives the UE capability information from the UE. The UE capability information does not include intraBandENDC-Support-v1540. Based on this, the network device determines that the UE supports a case in which the downlink carriers in the different radio access technologies are contiguous. The UE capability information includes intraBandENDCU1-Support, intraBandENDCU1-Support carries the value of the fourth indication information, and the value of the fourth indication information is "both." Based on this, the network device determines that the UE supports a case in which the uplink carriers in the different radio access technologies are non-contiguous and a case in which the uplink carriers in the different radio access technologies are contiguous. Therefore, the network device may determine the carrier aggregation capability of the UE as: the downlink carriers in the different radio access technologies are contiguous and the uplink carriers in the different radio access technologies are non-contiguous, and both the downlink carriers in the different radio access technologies and the uplink carriers in the different radio access technologies are contiguous.

Case 3: The UE capability information includes the third field, where the third field carries the value of the third indication information, and the value of the third indication information is the fifth state value.

Optionally, the UE capability information includes the third field, where the third field carries the value of the third indication information. When the value of the third indication information is the fifth state value, the UE capability information indicates, by default, that the downlink carriers in the different radio access technologies are non-contiguous and the uplink carriers in the different radio access technologies are non-contiguous.

It should be noted that the UE capability information includes the third field, where the third field carries the value of the third indication information. When the value of the third indication information is the fifth state value, regardless of whether the UE capability information includes the fourth field, the UE capability information may indicate, by default, that the downlink carriers in the different radio access technologies are non-contiguous and the uplink carriers in the different radio access technologies are non-contiguous.

For example, the UE capability information includes the third field, the third field is intraBandENDC-Support-v1540, the third field carries the value of the third indication information, the value of the third indication information is the fifth state value, the UE capability information includes the fourth field, the fourth field includes intraBandENDCU1-Support, the fourth field carries the value of the fourth indication information, the value of the fourth indication information is the fifth state value, and the fifth state value is "non-contiguous" (corresponding code is as follows). The UE capability information may indicate, by default, that neither the downlink carriers in the different radio access technologies nor the uplink carriers in the different radio access technologies are contiguous.

```
MRDC-Parameters : := SEQUENCE{
...
[[
  DualPA-Architecture            ENUMERATED {supported}
OPTIONAL,
  intraBandENDC-Support-v1540    ENUMERATED {non-contiguous }
OPTIONAL,
  ul-TimingAlignmentEUTRA-NR     ENUMERATED {required}
OPTIONAL
]]
[[
  intraBandENDCU1-Support        ENUMERATED {non-contiguous }
OPTIONAL
]]
}
```

For example, the UE capability information includes the third field, the third field is intraBandENDC-Support-v1540, the third field carries the value of the third indication information, the value of the third indication information is the fifth state value, the fifth state value is non-contiguous, the UE capability information includes the fourth field, the fourth field includes intraBandENDCU1-Support, the fourth field carries the value of the fourth indication information, the value of the fourth indication information is the sixth state value, and the sixth state value is both (corresponding code is as follows). The UE capability information may indicate, by default, that neither the downlink carriers in the different radio access technologies nor the uplink carriers in the different radio access technologies are contiguous.

```
MRDC-Parameters : := SEQUENCE{
...
[[
  DualPA-Architecture            ENUMERATED {supported}
OPTIONAL,
  intraBandENDC-Support-v1540    ENUMERATED {non-contiguous}
OPTIONAL,
  ul-TimingAlignmentEUTRA-NR     ENUMERATED {required}
OPTIONAL
]]
[[
  intraBandENDCU1-Support    ENUMERATED {both} OPTIONAL
]]
}
```

For example, the UE capability information includes the third field, the third field is intraBandENDC-Support-v1540, the third field carries the value of the third indication information, the value of the third indication information is the fifth state value, and the UE capability information does not include the fourth field (corresponding code is as follows). The UE capability information may indicate, by default, that neither the downlink carriers in the different radio access technologies nor the uplink carriers in the different radio access technologies are contiguous.

```
MRDC-Parameters : := SEQUENCE{
  ...
  [[
  DualPA-Architecture            ENUMERATED {supported}
OPTIONAL,
    intraBandENDC-Support-v1540  ENUMERATED
                                 {non-contiguous,both}
OPTIONAL,
    ul-TimingAlignmentEUTRA-NR   ENUMERATED {required}
OPTIONAL
  ]]
}
```

For example, the UE capability information includes the third field, the third field is intraBandENDC-Support-v1540, the third field carries the value of the third indication information, the value of the third indication information is the fifth state value, the fifth state value is non-contiguous, the UE capability information includes the fourth field, the fourth field includes intraBandENDCUl-Diff, the fourth field carries the value of the fourth indication information, the value of the fourth indication information is a seventh state value, and the seventh state value is different (corresponding code is as follows). The UE capability information may indicate, by default, that neither the downlink carriers in the different radio access technologies nor the uplink carriers in the different radio access technologies are contiguous.

```
MRDC-Parameters : := SEQUENCE{
  ...
  [[
  DualPA-Architecture            ENUMERATED {supported}
OPTIONAL,
    intraBandENDC-Support-v1540  ENUMERATED {non-contiguous}
OPTIONAL,
    ul-TimingAlignmentEUTRA-NR   ENUMERATED {required}
OPTIONAL
  ]]
  [[
  intraBandENDCUl-Diff           ENUMERATED {different}
OPTIONAL
  ]]
}
```

Optionally, the network device receives the UE capability information from the UE. The UE capability information includes the third field, the third field carries the value of the third indication information, and the value of the third indication information is the fifth state value. Based on this, the network device determines the carrier aggregation capability of the UE as: neither the downlink carriers in the different radio access technologies nor the uplink carriers in the different radio access technologies are contiguous.

Case 4: The UE capability information includes the third field and the fourth field, the third field carries the value of the third indication information, the value of the third indication information is the sixth state value, the fourth field carries the value of the fourth indication information, and the value of the fourth indication information is the sixth state value.

Optionally, the UE capability information includes the third field and the fourth field. The third field carries the value of the third indication information. When the value of the third indication information is the sixth state value, the third indication information indicates that the downlink carriers in the different radio access technologies are non-contiguous and that the downlink carriers in the different radio access technologies are contiguous. The fourth field carries the value of fourth indication information. When the value of the fourth indication information is the sixth state value, the fourth indication information indicates that the uplink carriers in the different radio access technologies are non-contiguous and that the uplink carriers in the different radio access technologies are contiguous. The UE capability information indicates that neither the downlink carriers in the different radio access technologies nor the uplink carriers in the different radio access technologies are contiguous and that both the downlink carriers in the different radio access technologies and the uplink carriers in the different radio access technologies are contiguous.

For example, the third field is intraBandENDC-Support-v1540, the fourth field is intraBandENDCUl-Support, and the sixth state value is "both" (corresponding code is as follows). The third indication information may indicate that the downlink carriers in the different radio access technologies are non-contiguous and that the downlink carriers in the different radio access technologies are contiguous, and the fourth indication information may indicate that the uplink carriers in the different radio access technologies are non-contiguous and that the uplink carriers in the different radio access technologies are contiguous. Therefore, the UE capability information may indicate that neither the downlink carriers in the different radio access technologies nor the uplink carriers in the different radio access technologies are contiguous and that both the downlink carriers in the different radio access technologies and the uplink carriers in the different radio access technologies are contiguous.

```
MRDC-Parameters : := SEQUENCE{
  ...
  [[
  DualPA-Architecture            ENUMERATED {supported}
OPTIONAL,
    intraBandENDC-Support-v1540  ENUMERATED {both} OPTIONAL,
    ul-TimingAlignmentEUTRA-NR   ENUMERATED {required}
OPTIONAL
  ]]
  [[
  intraBandENDCUl-Support        ENUMERATED {both} OPTIONAL
  ]]
}
```

Optionally, the network device receives the UE capability information from the UE. The UE capability information includes the third field and the fourth field, the third field carries the value of the third indication information, the value of the third indication information is the sixth state value, the fourth field carries the value of the fourth indication information, and the value of the fourth indication information is the sixth state value. Based on this, the network device determines the carrier aggregation capability of the UE as: neither the downlink carriers in the different radio access technologies nor the uplink carriers in the different radio access technologies are contiguous, and both the downlink carriers in the different radio access technologies and the uplink carriers in the different radio access technologies are contiguous.

For example, the third field is intraBandENDC-Support-v1540, the fourth field is intraBandENDCUl-Support, and the sixth state value is "both." The network device receives the UE capability information from the UE. The UE capability information includes the third field, the third field carries the value of the third indication information, and the value of the third indication information is "both." Based on this, the network device may determine that the UE supports a case in which the downlink carriers in the different radio access technologies are non-contiguous and a case in which the downlink carriers in the different radio access technologies are contiguous. The UE capability information includes the fourth field, the fourth field carries the value of the fourth indication information, and the value of the fourth indication information is "both." Based on this, the network device may determine that the UE supports a case in which the uplink carriers in the different radio access technologies are non-contiguous and a case in which the uplink carriers in the different radio access technologies are contiguous. Therefore, the network device may determine the carrier aggregation capability of the UE: Neither the downlink carriers in the different radio access technologies nor the uplink carriers in the different radio access technologies are contiguous, and both the downlink carriers in the different radio access technologies and the uplink carriers in the different radio access technologies are contiguous.

Case 5: The UE capability information includes the third field and the fourth field, the third field carries the value of the third indication information, the value of the third indication information is the sixth state value, the fourth field carries the value of the fourth indication information, and the value of the fourth indication information is the fifth state value.

Optionally, the UE capability information includes the third field and the fourth field. The third field carries the value of the third indication information. When the value of the third indication information is the sixth state value, the third indication information indicates that the downlink carriers in the different radio access technologies are non-contiguous and that the downlink carriers in the different radio access technologies are contiguous. The fourth field carries the value of fourth indication information. When the value of the fourth indication information is the fifth state value, the fourth indication information indicates that the uplink carriers in the different radio access technologies are non-contiguous. The UE capability information indicates that neither the downlink carriers in the different radio access technologies nor the uplink carriers in the different radio access technologies are contiguous and that the downlink carriers in the different radio access technologies are contiguous and the uplink carriers in the different radio access technologies are non-contiguous.

For example, the third field is intraBandENDC-Support-v1540, the sixth state value is both, the fourth field is intraBandENDCUl-Support, and the fifth state value is non-contiguous (corresponding code is as follows). The third indication information may indicate that the downlink carriers in the different radio access technologies are non-contiguous and that the downlink carriers in the different radio access technologies are contiguous, and the fourth indication information may indicate that the uplink carriers in the different radio access technologies are non-contiguous. Therefore, the UE capability information may indicate that neither the downlink carriers in the different radio access technologies nor the uplink carriers in the different radio access technologies are contiguous and that the downlink carriers in the different radio access technologies are contiguous and the uplink carriers in the different radio access technologies are non-contiguous.

```
MRDC-Parameters : := SEQUENCE{
...
[[
DualPA-Architecture                ENUMERATED {supported}
OPTIONAL,
    intraBandENDC-Support-v1540 ENUMERATED {both} OPTIONAL,
    ul-TimingAlignmentEUTRA-NR     ENUMERATED {required}
OPTIONAL
]]
[[
intraBandENDCUl-Support            ENUMERATED {non-contiguous}
OPTIONAL
]]
}
```

Optionally, the network device receives the UE capability information from the UE. The UE capability information includes the third field and the fourth field, the third field carries the value of the third indication information, the value of the third indication information is the sixth state value, the fourth field carries the value of the fourth indication information, and the value of the fourth indication information is the fifth state value. Based on this, the network device determines the carrier aggregation capability of the UE as: Neither the downlink carriers in the different radio access technologies nor the uplink carriers in the different radio access technologies are contiguous, and the downlink carriers in the different radio access technologies are contiguous and the uplink carriers in the different radio access technologies are non-contiguous.

For example, the third field is intraBandENDC-Support-v1540, the sixth state value is both, the fourth field is intraBandENDCUl-Support, and the fifth state value is non-contiguous. The network device receives the UE capability information from the UE. The UE capability information includes the third field, the third field carries the value of the third indication information, and the value of the third indication information is the sixth state value. Based on this, the network device may determine that the UE supports a case in which the downlink carriers in the different radio access technologies are non-contiguous and a case in which the downlink carriers in the different radio access technologies are contiguous. The UE capability information includes the fourth field, the fourth field carries the value of the fourth indication information, and the value of the fourth indication information is the fifth state value. Based on this, the network device may determine that the UE supports a case in which the uplink carriers in the different radio access technologies are non-contiguous. Therefore, the network device may determine the carrier aggregation capability of the UE as: neither the downlink carriers in the different radio access technologies nor the uplink carriers in the different radio access technologies are contiguous, and the downlink carriers in the different radio access technologies are contiguous and the uplink carriers in the different radio access technologies are non-contiguous.

Case 6: The UE capability information includes the third field and the fourth field, the third field carries the value of the third indication information, the value of the third indication information is the sixth state value, the fourth field carries the value of the fourth indication information, and the value of the fourth indication information is a seventh state value.

Optionally, the UE capability information includes the third field and the fourth field. The third field carries the value of the third indication information. When the value of the third indication information is the sixth state value, the third indication information indicates that the downlink carriers in the different radio access technologies are non-contiguous and that the downlink carriers in the different radio access technologies are contiguous. The fourth field carries the value of fourth indication information. When the value of the fourth indication information is the seventh state value, the fourth indication information indicates that a contiguous manner of the uplink carriers in the different radio access technologies is inconsistent with that indicated in intraBandENDC-Support-v1540 in the conventional technology. The UE capability information indicates that neither the downlink carriers in the different radio access technologies nor the uplink carriers in the different radio access technologies are contiguous and that the downlink carriers in the different radio access technologies are contiguous and the uplink carriers in the different radio access technologies are non-contiguous.

For example, the third field is intraBandENDC-Support-v1540, the sixth state value is both, the fourth field is intraBandENDCU1-Diff, and the seventh state value is different (corresponding code is as follows). The third indication information may indicate that the downlink carriers in the different radio access technologies are non-contiguous and that the downlink carriers in the different radio access technologies are contiguous, and the fourth indication information may indicate that the contiguous manner of the uplink carriers in the different radio access technologies is inconsistent with that indicated in intraBandENDC-Support-v1540 in the conventional technology (in the conventional technology, the UE capability information includes intraBandENDC-Support-v1540, an enumerated value is both, and may indicate that neither the uplink carriers in the different radio access technologies nor the downlink carriers in the different radio access technologies are contiguous and that both the uplink carriers in the different radio access technologies and the downlink carriers in the different radio access technologies are contiguous, and therefore, the fourth indication information may indicate that the uplink carriers in the different radio access technologies are contiguous and that the uplink carriers in the different radio access technologies are non-contiguous). However, a capability of intra-band-Endc-BandCombination does not include that the downlink carriers in the different radio access technologies are non-contiguous and the uplink carriers in the different radio access technologies are contiguous. Therefore, the UE capability information may indicate, by default, that neither the downlink carriers in the different radio access technologies nor the uplink carriers in the different radio access technologies are contiguous and that the downlink carriers in the different radio access technologies are contiguous and the uplink carriers in the different radio access technologies are non-contiguous.

```
MRDC-Parameters : := SEQUENCE{
...
[[
    DualPA-Architecture              ENUMERATED {supported}
OPTIONAL,
    intraBandENDC-Support-v1540      ENUMERATED {both} OPTIONAL,
    ul-TimingAlignmentEUTRA-NR       ENUMERATED {required}
OPTIONAL
]]
[[
    intraBandENDCU1-Diff             ENUMERATED {different}
OPTIONAL
]]
}
```

Optionally, the network device receives the UE capability information from the UE. The UE capability information includes the third field and the fourth field, the third field carries the value of the third indication information, the value of the third indication information is the sixth state value, the fourth field carries the value of the fourth indication information, and the value of the fourth indication information is the seventh state value. Based on this, the network device determines the carrier aggregation capability of the UE: Neither the downlink carriers in the different radio access technologies nor the uplink carriers in the different radio access technologies are contiguous, and the downlink carriers in the different radio access technologies are contiguous and the uplink carriers in the different radio access technologies are non-contiguous.

For example, the third field is intraBandENDC-Support-v1540, the sixth state value is both, the fourth field is intraBandENDCU1-Diff, and the seventh state value is different. The network device receives the UE capability information from the UE. The UE capability information includes the third field, the third field carries the value of the third indication information, and the value of the third indication information is both. Based on this, the network device may determine that the UE supports a case in which the downlink carriers in the different radio access technologies are non-contiguous and a case in which the downlink carriers in the different radio access technologies are contiguous. The UE capability information includes the fourth field, the fourth field carries the value of the fourth indication information, and the value of the fourth indication information is different. Based on this, the network device may determine that the contiguous manner of the uplink carriers in the different radio access technologies is inconsistent with that indicated in intraBandENDC-Support-v1540 in the conventional technology. However, the capability of intra-band-Endc-BandCombination does not include that the downlink carriers in the different radio access technologies are non-contiguous and the uplink carriers in the different radio access technologies are contiguous. Therefore, the network device may determine the carrier aggregation capability of the UE: Neither the downlink carriers in the different radio access technologies nor the uplink carriers in the different radio access technologies are contiguous, and the downlink carriers in the different radio access technologies are contiguous and the uplink carriers in the different radio access technologies are non-contiguous.

Case 7: The UE capability information does not include the third field and the fourth field.

Optionally, when the UE capability information does not include the third field and the fourth field, the third indication information indicates that the downlink carriers in the different radio access technologies are contiguous, and the fourth indication information indicates that the uplink carriers in the different radio access technologies are contiguous.

For example, the third field is intraBandENDC-Support-v1540, and the fourth field is intraBandENDCU1-Support. The third indication information may indicate that the downlink carriers in the different radio access technologies are contiguous, and the fourth indication information may indicate that the uplink carriers in the different radio access technologies are contiguous. Therefore, the UE capability information may indicate that both the downlink carriers in the different radio access technologies and the uplink carriers in the different radio access technologies are contiguous.

For example, the third field is intraBandENDC-Support-v1540, and the fourth field is intraBandENDCU1-Diff. The third indication information may indicate that the downlink carriers in the different radio access technologies are contiguous, and the fourth indication information may indicate that the uplink carriers in the different radio access technologies are contiguous. Therefore, the UE capability information may indicate that both the downlink carriers in the different radio access technologies and the uplink carriers in the different radio access technologies are contiguous.

Optionally, the network device receives the UE capability information from the UE. The UE capability information does not include the third field and the fourth field. Based on this, the network device determines the carrier aggregation capability of the UE as: both the downlink carriers in the different radio access technologies and the uplink carriers in the different radio access technologies are contiguous.

For example, the third field is intraBandENDC-Support-v1540, and the fourth field is intraBandENDCUl-Support. The network device receives the UE capability information from the UE. The UE capability information does not include intraBandENDC-Support-v1540 and intraBandENDCUl-Support. Based on this, the network device may determine the carrier aggregation capability of the UE as: both the downlink in the different radio access technologies and the uplink carriers in the different radio access technologies are contiguous.

For example, the third field is intraBandENDC-Support-v1540, and the fourth field is intraBandENDCUl-Diff. The network device receives the UE capability information from the UE. The UE capability information does not include intraBandENDC-Support-v1540 and intraBandENDCUl-Diff. Based on this, the network device may determine the carrier aggregation capability of the UE: Both the downlink in the different radio access technologies and the uplink carriers in the different radio access technologies are contiguous.

Case 8: The UE capability information includes the third field, where the third field carries the value of the third indication information, the value of the third indication information is the sixth state value, and the UE capability information does not include the fourth field.

Optionally, when the UE capability information includes the third field, the third field carries the value of the third indication information, the value of the third indication information is the sixth state value, and the UE capability information does not include the fourth field, the UE capability information does not indicate the carrier aggregation capability of the UE. That is, the UE capability information is invalid.

For example, the third field is intraBandENDC-Support-v1540, the sixth state value is both, the UE capability information does not include the fourth field, and the fourth field includes intraBandENDCUl-Support. The third indication information may indicate that the downlink carriers in the different radio access technologies are contiguous and that the downlink carriers in the different radio access technologies are non-contiguous, and the fourth indication information indicates that the uplink carriers in the different radio access technologies are contiguous. Therefore, the UE capability information may indicate that both the uplink carriers in the different radio access technologies and the downlink carriers in the different radio access technologies are contiguous and that the uplink carriers in the different radio access technologies are contiguous and the downlink carriers in the different radio access technologies are non-contiguous. However, a capability of intra-band-Endc-BandCombination does not include that the downlink carriers in the different radio access technologies are non-contiguous and the uplink carriers in the different radio access technologies are contiguous. Therefore, in this case, the UE capability information is invalid.

Optionally, the UE capability information includes the third field. The third field carries the value of the third indication information. When the value of the third indication information is the sixth state value, the third indication information indicates that the downlink carriers in the different radio access technologies are non-contiguous and that the downlink carriers in the different radio access technologies are contiguous. The UE capability information does not include the fourth field. The fourth indication information indicates that a contiguous manner of the uplink carriers in the different radio access technologies is consistent with that indicated in intraBandENDC-Support-v1540 in the conventional technology.

For example, the third field is intraBandENDC-Support-v1540, the sixth state value is both, the UE capability information does not include the fourth field, and the fourth field is intraBandENDCUl-Diff. The third indication information may indicate that the downlink carriers in the different radio access technologies are non-contiguous and that the downlink carriers in the different radio access technologies are contiguous, and the fourth indication information may indicate that the contiguous manner of the uplink carriers in the different radio access technologies is consistent with that indicated in intraBandENDC-Support-v1540 in the conventional technology (in the conventional technology, the UE capability information includes intraBandENDC-Support-v1540, an enumerated value is both, and may indicate that neither the uplink carriers in the different radio access technologies nor the downlink carriers in the different radio access technologies are contiguous and that both the uplink carriers in the different radio access technologies and the downlink carriers in the different radio access technologies are contiguous, and therefore, the fourth indication information may indicate that the uplink carriers in the different radio access technologies are non-contiguous and that the uplink carriers in the different radio access technologies are contiguous). Therefore, the UE capability information may indicate that neither the downlink carriers in the different radio access technologies nor the uplink carriers in the different radio access technologies are contiguous and that both the downlink carriers in the different radio access technologies and the uplink carriers in the different radio access technologies are contiguous.

Optionally, in the third implementation scenario of the embodiment shown in FIG. 4, when the quantity of the uplink carriers in the different radio access technologies is less than the quantity of the downlink carriers in the different radio access technologies in the band, the UE capability information may include carrier aggregation capability indication information of the UE. The carrier aggregation capability indication information of the UE indicates the carrier aggregation capability of the UE.

Optionally, the carrier aggregation capability of the UE includes that the downlink carriers in the different radio access technologies are contiguous and the uplink carriers in the different radio access technologies are non-contiguous, that the downlink carriers in the different radio access technologies are contiguous and the uplink carriers in the different radio access technologies are non-contiguous and that both the downlink carriers in the different radio access technologies and the uplink carriers in the different radio access technologies are contiguous, or that both the downlink carriers in the different radio access technologies and the uplink carriers in the different radio access technologies are contiguous.

In this scenario, a field such as a second field is newly added to the UE capability information, and the carrier aggregation capability indication information of the UE may be explicitly or implicitly indicated depending on whether the UE capability information includes the second field.

Optionally, if the UE capability information does not include the second field, the carrier aggregation capability indication information of the UE is implicitly indicated. By default, the carrier aggregation capability indication information of the UE indicates that both the uplink carriers in the different radio access technologies and the downlink carriers in the different radio access technologies are contiguous. If the UE capability information includes the second field, the carrier aggregation capability indication information of the UE is explicitly indicated. In this case, the second field may carry a value of the carrier aggregation capability indication information of the UE. The value of the carrier aggregation capability indication information of the UE carried in the second field may be used to indicate that the downlink carriers in the different radio access technologies are contiguous and the uplink carriers in the different radio access technologies are non-contiguous, or that the downlink carriers in the different radio access technologies are contiguous and the uplink carriers in the different radio access technologies are non-contiguous and that both the downlink carriers in the different radio access technologies and the uplink carriers in the different radio access technologies are contiguous.

Optionally, the second field carries the value of the carrier aggregation capability indication information of the UE. When the value of the carrier aggregation capability indication information of the UE is a third state value, the UE capability information indicates that the downlink carriers in the different radio access technologies are contiguous and the uplink carriers in the different radio access technologies are non-contiguous. When the value of the carrier aggregation capability indication information of the UE is a fourth state value, the UE capability information indicates that the downlink carriers in the different radio access technologies are contiguous and the uplink carriers in the different radio access technologies are non-contiguous and that both the downlink carriers in the different radio access technologies and the uplink carriers in the different radio access technologies are contiguous.

For example, the second field is an uplink-downlink carrier contiguous manner flag (DlUlCcContiguousFlag). DlUlCcContiguousFlag is an optional field. For example, DlUlCcContiguousFlag may or may not be included in the UE capability information. When the DlUlCcContiguousFlag is included in the UE capability information, DlUlCcContiguousFlag has corresponding enumerated values. The enumerated values may be dlconti-ulnonconti and "both."

The enumerated value dlconti-ulnonconti may be the third state value, and the enumerated value "both" may be the fourth state value. The following describes the UE capability information by using an example in which the second field is DlUlCcContiguousFlag.

(1) The UE capability information does not include DlUlCcContiguousFlag. The carrier aggregation capability indication information of the UE indicates that both the uplink carriers in the different radio access technologies and the downlink carriers in the different radio access technologies are contiguous.

(2) The UE capability information includes DlUlCcContiguousFlag, and an enumerated value of DlUlCcContiguousFlag is dlconti-ulnonconti. The carrier aggregation capability indication information of the UE may be used to indicate that the downlink carriers in the different radio access technologies are contiguous and the uplink carriers in the different radio access technologies are non-contiguous.

(3) The UE capability information includes DlUlCcContiguousFlag, and an enumerated value of DlUlCcContiguousFlag is "both." The carrier aggregation capability indication information of the UE may be used to indicate that the downlink carriers in the different radio access technologies are contiguous and the uplink carriers in the different radio access technologies are non-contiguous and that both the downlink carriers in the different radio access technologies and the uplink carriers in the different radio access technologies are contiguous.

Optionally, DlUlCcContiguousFlag is included in a substructure mrdc-Parameters of UECapabilityInformation.

For example, in the following code, DlUlCcContiguousFlag indicates the carrier aggregation capability of the UE. When an enumerated value is dlconti-ulnonconti, DlUlCcContiguousFlag may be used to indicate that the downlink carriers in the different radio access technologies are contiguous and the uplink carriers in the different radio access technologies are non-contiguous. When an enumerated value is "both," DlUlCcContiguousFlag may be used to indicate that the downlink carriers in the different radio access technologies are contiguous and the uplink carriers in the different radio access technologies are non-contiguous and that both the downlink carriers in the different radio access technologies and the uplink carriers in the different radio access technologies are contiguous. For descriptions of DualPA-Architecture, intraBandENDC-Support-v1540, and ul-TimingAlignmentEUTRA-NR, refer to descriptions in the third implementation scenario of the embodiment shown in FIG. 4.

```
MRDC-Parameters : := SEQUENCE{
...
[[
    DualPA-Architecture              ENUMERATED {supported} OPTIONAL,
    intraBandENDC-Support-v1540      ENUMERATED
                                     {non-contiguous,both} OPTIONAL,
    ul-TimingAlignmentEUTRA-NR       ENUMERATED {required} OPTIONAL
]]
[[
    DlUlCcContiguousFlag    ENUMERATED {dlconti-ulnonconti,both} OPTIONAL
]]
}
```

Optionally, the network device receives the UE capability information from the UE. When the quantity of the uplink carriers in the different radio access technologies is less than the quantity of the downlink carriers in the different radio access technologies in the band, the network device determines the carrier aggregation capability of the UE depending on whether the UE capability information includes the second field.

For example, if the UE capability information does not include the second field, the network device determines the carrier aggregation capability of the UE: Both the downlink carriers in the different radio access technologies and the uplink carriers in the different radio access technologies are contiguous. If the UE capability information includes the second field, the second field carries the value of the carrier aggregation capability indication information of the UE, and the value of the carrier aggregation capability indication information of the UE is the third state value, the network device determines the carrier aggregation capability of the UE as that the downlink carriers in the different radio access technologies are contiguous and the uplink carriers in the different radio access technologies are non-contiguous. If the UE capability information includes the second field, the second field carries the value of the carrier aggregation capability indication information of the UE, and the value of the carrier aggregation capability indication information of the UE is the fourth state value, the network device determines the carrier aggregation capability of the UE: The downlink carriers in the different radio access technologies are contiguous and the uplink carriers in the different radio access technologies are non-contiguous, and both the downlink carriers in the different radio access technologies and the uplink carriers in the different radio access technologies are contiguous.

Based on the third implementation scenario of the embodiment shown in FIG. 4, when the quantity of the uplink carriers in the different radio access technologies is less than the quantity of the downlink carriers in the different radio access technologies in the ban, the UE capability information may explicitly or implicitly indicate the carrier aggregation capability indication information of the UE.

Optionally, in a fourth implementation scenario of the embodiment shown in FIG. 4, the carrier aggregation capability of the UE includes at least one of the following: both the downlink carriers in the different radio access technologies and the uplink carriers in the different radio access technologies are contiguous, neither the downlink carriers in the different radio access technologies nor the uplink carriers in the different radio access technologies are contiguous, and the downlink carriers in the different radio access technologies are contiguous and the uplink carriers in the different radio access technologies are non-contiguous. The UE capability information includes first indication information and/or second indication information, and the UE may indicate the carrier aggregation capability of the UE by using the first indication information and/or the second indication information that are/is included in the UE capability information.

The first indication information and the second indication information are different.

Optionally, the UE capability information includes a first field and/or the third field.

The third field is intraBandENDC-Support-v1540. For descriptions of intraBandENDC-Support-v1540, refer to descriptions of intraBandENDC-Support-v1540 in the conventional technology. Details are not described herein again.

For example, the first field may be downlink carrier contiguous-uplink carrier non-contiguous indication information (dlconti-ulnonconti). dlconti-ulnonconti is an optional field. For example, dlconti-ulnonconti may or may not be included in the UE capability information. When dlconti-ulnonconti is included in the UE capability information, dlconti-ulnonconti has corresponding enumerated values. The enumerated values may be "only" and "supported."

When an enumerated value is only, the first indication information may be used to indicate that the downlink carriers in the different radio access technologies are contiguous and the uplink carriers in the different radio access technologies are non-contiguous and that the second indication information is invalid. When an enumerated value is supported, the first indication information may be used to indicate that downlink carriers in the different radio access technologies are contiguous and the uplink carriers in the different radio access technologies are non-contiguous and that the second indication information is valid.

Optionally, the UE capability information includes the first field. The first field carries a value of the first indication information. When the value of the first indication information is a first state value, the first indication information indicates that the downlink carriers in the different radio access technologies are contiguous and the uplink carriers in the different radio access technologies are non-contiguous and that the second indication information is invalid.

That the second indication information is invalid may indicate that the UE capability information determines the carrier aggregation capability of the UE based on the first indication information.

For example, the UE capability information includes the first field, the first field is dlconti-ulnonconti, the first field carries the value of the first indication information, the value of the first indication information is the first state value, the first state value is "only," the UE capability information does not include the third field, and the third field is intraBandENDC-Support-v1540. The first indication information indicates that the downlink carriers in the different radio access technologies are contiguous and the uplink carriers in the different radio access technologies are non-contiguous and that the second indication information is invalid. The second indication information indicates that both the downlink carriers in the different radio access technologies and the uplink carriers in the different radio access technologies are contiguous. Because the first indication information indicates that the second indication information is invalid, the UE capability information may indicate that the downlink carriers in the different radio access technologies are contiguous and the uplink carriers in the different radio access technologies are non-contiguous.

For example, the UE capability information includes the first field, the first field is dlconti-ulnonconti, the first field carries the value of the first indication information, the value of the first indication information is the first state value, the first state value is "only," the UE capability information includes the third field, the third field is intraBandENDC-Support-v1540, the third field carries a value of the second indication information, the value of the second indication information is a third state value, and the third state value is non-contiguous. The first indication information indicates that the downlink carriers in the different radio access technologies are contiguous and the uplink carriers in the different radio access technologies are non-contiguous and that the second indication information is invalid. The second indication information indicates that neither the downlink carriers in the different radio access technologies nor the uplink carriers in the different radio access technologies are contiguous. Because the first indication information indicates that the second indication information is invalid, the UE capability information may indicate that the downlink carriers in the different radio access technologies are contiguous and the uplink carriers in the different radio access technologies are non-contiguous.

For example, the UE capability information includes the first field, the first field is dlconti-ulnonconti, the first field carries the value of the first indication information, the value of the first indication information is the first state value, the first state value is "only," the UE capability information includes the third field, the third field is intraBandENDC-Support-v1540, the third field carries a value of the second indication information, the value of the second indication information is a fourth state value, and the fourth state value is both. The first indication information indicates that the downlink carriers in the different radio access technologies are contiguous and the uplink carriers in the different radio access technologies are non-contiguous and that the second indication information is invalid. The second indication information indicates that neither the downlink carriers in the different radio access technologies nor the uplink carriers in the different radio access technologies are contiguous and that both the downlink carriers in the different radio access technologies and the uplink carriers in the different radio access technologies are contiguous. Because the first indication information indicates that the second indication information is invalid, the UE capability information may indicate that the downlink carriers in the different radio access technologies are contiguous and the uplink carriers in the different radio access technologies are non-contiguous.

Optionally, the UE capability information includes the first field. The first field carries the value of the first indication information. When the value of the first indication information is a second state value, the first indication information indicates that the downlink carriers in the different radio access technologies are contiguous and the uplink carriers in the different radio access technologies are non-contiguous and that the second indication information is valid.

That the second indication information is valid may indicate that the UE capability information determines the carrier aggregation capability of the UE based on the first indication information and the second indication information.

For example, the UE capability information includes the first field, the first field is dlconti-ulnonconti, the first field carries the value of the first indication information, the value of the first indication information is the second state value, the second state value is supported, the UE capability information does not include the third field, and the third field is intraBandENDC-Support-v1540. The first indication information indicates that the downlink carriers in the different radio access technologies are contiguous and the uplink carriers in the different radio access technologies are non-contiguous and that the second indication information is valid. The second indication information indicates that both the downlink carriers in the different radio access technologies and the uplink carriers in the different radio access technologies are contiguous. Because the first indication information indicates that the second indication information is valid, the UE capability information may indicate that the downlink carriers in the different radio access technologies are contiguous and the uplink carriers in the different radio access technologies are non-contiguous and that both the downlink carriers in the different radio access technologies and the uplink carriers in the different radio access technologies are contiguous.

For example, the UE capability information includes the first field, the first field is dlconti-ulnonconti, the first field carries the value of the first indication information, the value of the first indication information is the second state value, the second state value is "supported," the UE capability information includes the third field, the third field is intra-BandENDC-Support-v1540, the third field carries a value of the second indication information, the value of the second indication information is a third state value, and the third state value is "non-contiguous." The first indication information indicates that the downlink carriers in the different radio access technologies are contiguous and the uplink carriers in the different radio access technologies are non-contiguous and that the second indication information is valid. The second indication information indicates that neither the downlink carriers in the different radio access technologies nor the uplink carriers in the different radio access technologies are contiguous. Because the first indication information indicates that the second indication information is valid, the UE capability information may indicate that the downlink carriers in the different radio access technologies are contiguous and the uplink carriers in the different radio access technologies are non-contiguous and that neither the downlink carriers in the different radio access technologies nor the uplink carriers in the different radio access technologies are contiguous.

For example, the UE capability information includes the first field, the first field is dlconti-ulnonconti, the first field carries the value of the first indication information, the value of the first indication information is the second state value, the second state value is "supported," the UE capability information includes the third field, the third field is intraBandENDC-Support-v1540, the third field carries a value of the second indication information, the value of the second indication information is a fourth state value, and the fourth state value is "both." The first indication information indicates that the downlink carriers in the different radio access technologies are contiguous and the uplink carriers in the different radio access technologies are non-contiguous and that the second indication information is valid. The second indication information indicates that neither the downlink carriers in the different radio access technologies nor the uplink carriers in the different radio access technologies are contiguous and that both the downlink carriers in the different radio access technologies and the uplink carriers in the different radio access technologies are contiguous. Because the first indication information indicates that the second indication information is valid, the UE capability information may indicate that the downlink carriers in the different radio access technologies are contiguous and the uplink carriers in the different radio access technologies are non-contiguous, that neither the downlink carriers in the different radio access technologies nor the uplink carriers in the different radio access technologies are contiguous, and that both the downlink carriers in the different radio access technologies and the uplink carriers in the different radio access technologies are contiguous.

Optionally, the UE capability information does not include the first field, and the first indication information is invalid.

That the first indication information is invalid may indicate that the UE capability information determines the carrier aggregation capability of the UE based on the second indication information.

For example, the UE capability information does not include dlconti-ulnonconti, the UE capability information includes the third field, the third field is intraBandENDC-Support-v1540, the third field carries a value of the second indication information, the value of the second indication information is a third state value, and the third state value is non-contiguous. The first indication information is invalid, and the second indication information indicates that neither the downlink carriers in the different radio access technologies nor the uplink carriers in the different radio access technologies are contiguous. Therefore, the UE capability information may indicate that neither the downlink carriers in the different radio access technologies nor the uplink carriers in the different radio access technologies are contiguous.

It should be noted that a case in which neither the downlink carriers in the different radio access technologies nor the uplink carriers in the different radio access technologies are contiguous, a case in which both the downlink carriers in the different radio access technologies and the uplink carriers in the different radio access technologies are contiguous, and a case in which neither the downlink carriers in the different radio access technologies nor the uplink carriers in the different radio access technologies are contiguous and both the downlink carriers in the different radio access technologies and the uplink carriers in the different radio access technologies are contiguous may be indicated by using the field intraBandENDC-Support-v1540 in the conventional technology.

Optionally, dlconti-ulnonconti is included in a substructure mrdc-Parameters of UECapabilityInformation.

For example, in the following code, dlconti-ulnonconti indicates that the downlink carriers in the different radio access technologies are contiguous and the uplink carriers in the different radio access technologies are non-contiguous and whether the second indication information is valid. When the enumeration value is set to "only," dlconti-ulnonconti may be used to indicate that the downlink carriers in the different radio access technologies are contiguous and the uplink carriers in the different radio access technologies are non-contiguous and that the second indication information is invalid. When the enumeration value is set to "supported," dlconti-ulnonconti may be used to indicate that the downlink carriers in the different radio access technologies are contiguous and the uplink carriers in the different radio access technologies are non-contiguous and that the second indication information is valid. For the descriptions of DualPA-Architecture, intraBandENDC-Support-v1540, and ul-TimingAlignmentEUTRA-NR, refer to the descriptions in the third implementation scenario of the embodiment shown in FIG. 4.

```
MRDC-Parameters : := SEQUENCE{
...
[[
DualPA-Architecture              ENUMERATED {supported}
OPTIONAL,
   intraBandENDC-Support-v1540   ENUMERATED
                                 {non-contiguous,both}
OPTIONAL,
   ul-TimingAlignmentEUTRA-NR    ENUMERATED {required}
OPTIONAL
]]
[[
   dlconti-ulnonconti            ENUMERATED {only,supported}
OPTIONAL
]]
}
```

Optionally, the network device receives the UE capability information from the UE, and the network device determines the carrier aggregation capability of the UE depending on whether the UE capability information includes the first field and/or the third field.

For example, if the UE capability information includes the first field, the first field carries the value of the first indication information, the value of the first indication information is the first state value, and the UE capability information does not include intraBandENDC-Support-v1540, the network device may determine the carrier aggregation capability of the UE as: the downlink carriers in the different radio access technologies are contiguous and the uplink carriers in the different radio access technologies are non-contiguous.

For example, if the UE capability information includes the first field, the first field carries the value of the first indication information, the value of the first indication information is the second state value, and the UE capability information does not include intraBandENDC-Support-v1540, the network device may determine the carrier aggregation capability of the UE as: that the downlink carriers in the different radio access technologies are contiguous and the uplink carriers in the different radio access technologies are non-contiguous, and that both the downlink carriers in the different radio access technologies and the uplink carriers in the different radio access technologies are contiguous.

The foregoing mainly describes the solutions provided in the embodiments of this application from a perspective of interaction between the network elements. It can be understood that the foregoing user equipment, network device, or the like includes a corresponding hardware structure and/or software module for performing each function, to implement the foregoing functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the user equipment and the network device may be divided into function modules based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in the embodiments of this application, division into the modules is an example, and is merely logical function division. Another division manner may be used during actual implementation.

Figure 6:
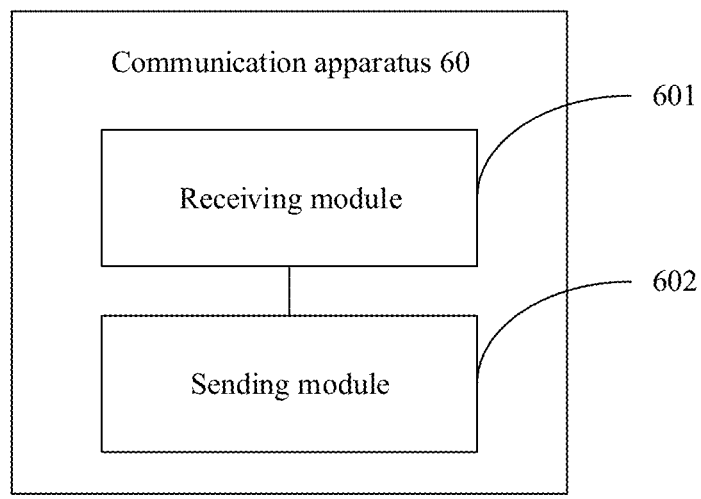
FIG. 6 is a schematic diagram 1 of a structure of a communication apparatus according to an embodiment of this application.

For example, when the function modules are obtained through division in an integrated manner, FIG. 6 is a schematic diagram of a structure of a communication apparatus 60. The communication apparatus 60 includes a receiving module 601 and a sending module 602.

The receiving module 601 is configured to receive UE capability enquiry information from a network device, where the UE supports a plurality of different radio access technologies, and the UE capability enquiry information is used to enquire a capability of the UE.

The sending module 602 is configured to send UE capability information to the network device based on the UE capability enquiry information, where the UE capability information indicates a carrier aggregation capability of the UE, and the carrier aggregation capability of the UE includes that the downlink carriers in the different radio access technologies are contiguous and the uplink carriers in the different radio access technologies are non-contiguous.

Optionally, the UE capability information includes first indication information and second indication information; the first indication information indicates that the downlink carriers in the different radio access technologies are contiguous and the uplink carriers in the different radio access technologies are non-contiguous and whether the second indication information is valid; and the second indication information indicates at least one of the following: both the downlink carriers in the different radio access technologies and the uplink carriers in the different radio access technologies are contiguous and neither the downlink carriers in the different radio access technologies nor the uplink carriers in the different radio access technologies are contiguous.

Optionally, the UE capability information includes a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

Optionally, the carrier aggregation capability of the UE further includes at least one of the following: both the downlink carriers in the different radio access technologies and the uplink carriers in the different radio access technologies are contiguous and neither the downlink carriers in the different radio access technologies nor the uplink carriers in the different radio access technologies are contiguous; and the UE capability information includes a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

Optionally, when a quantity of the uplink carriers in the different radio access technologies is less than a quantity of the downlink carriers in the different radio access technologies, the carrier aggregation capability of the UE further includes that both the uplink carriers in the different radio access technologies and the downlink carriers in the different radio access technologies are contiguous and the downlink carriers in the different radio access technologies are contiguous and the uplink carriers in the different radio access technologies are non-contiguous.

Optionally, the UE capability information includes carrier aggregation capability indication information of the UE and a second field, and the second field carries a value of the carrier aggregation capability indication information of the UE; and when the value of the carrier aggregation capability indication information of the UE is a third state value, the UE capability information indicates that the downlink carriers in the different radio access technologies are contiguous and the uplink carriers in the different radio access technologies are non-contiguous.

Optionally, when the value of the carrier aggregation capability indication information of the UE is a fourth state value, the UE capability information indicates: that both the uplink carriers in the different radio access technologies and the downlink carriers in the different radio access technologies are contiguous and the downlink carriers in the different radio access technologies are contiguous and the uplink carriers in the different radio access technologies are non-contiguous.

All related content of the operations in the foregoing method embodiment may be referenced in the function descriptions of the corresponding functional modules. Details are not described herein again.

In this embodiment, the communication apparatus 60 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. In a simple embodiment, a person skilled in the art may figure out that the communication apparatus 60 may be in the form shown in FIG. 3.

For example, the processor 301 in FIG. 3 may invoke the computer-executable instructions stored in the memory 303, so that the communication apparatus 60 performs the method for reporting user equipment capability information in the foregoing method embodiment.

For example, the functions/implementation processes of the receiving module 601 and the sending module 602 in FIG. 6 may be implemented by the processor 301 in FIG. 3 invoking the computer-executable instructions stored in the memory 303. Alternatively, the functions/implementation processes of the receiving module 601 and the sending module 602 in FIG. 6 may be implemented by the communication interface 304 in FIG. 3.

The communication apparatus 60 provided in this embodiment can perform the method for reporting user equipment capability information. Therefore, for a technical effect that can be achieved by the communication apparatus 60, refer to the foregoing method embodiment. Details are not described herein again.

Figure 7:
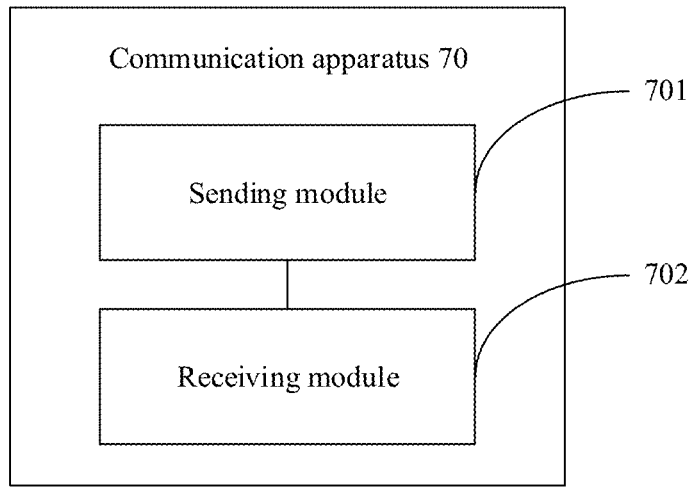
FIG. 7 is a schematic diagram 2 of a structure of a communication apparatus according to an embodiment of this application.

For example, when the function modules are obtained through division in an integrated manner, FIG. 7 is a schematic diagram of a structure of a communication apparatus 70. The communication apparatus 70 includes a sending module 701 and a receiving module 702.

The sending module 701 is configured to send UE capability enquiry information to a UE, where the UE supports a plurality of different radio access technologies, and the UE capability enquiry information is used to enquire a capability of the UE.

The receiving module 702 is configured to receive UE capability information from the UE, where the UE capability information indicates a carrier aggregation capability of the UE, and the carrier aggregation capability of the UE includes that downlink carriers in the different radio access technologies are contiguous and uplink carriers in the different radio access technologies are non-contiguous.

Optionally, the UE capability information includes first indication information and second indication information; the first indication information indicates that the downlink carriers in the different radio access technologies are contiguous and the uplink carriers in the different radio access technologies are non-contiguous and whether the second indication information is valid; and the second indication information indicates at least one of the following: both the downlink carriers in the different radio access technologies and the uplink carriers in the different radio access technologies are contiguous and neither the downlink carriers in the different radio access technologies nor the uplink carriers in the different radio access technologies are contiguous.

Optionally, the UE capability information includes a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

Optionally, the carrier aggregation capability of the UE further includes at least one of the following: both the downlink carriers in the different radio access technologies and the uplink carriers in the different radio access technologies are contiguous and neither the downlink carriers in the different radio access technologies nor the uplink carriers in the different radio access technologies are contiguous; and the UE capability information includes a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

Optionally, when a quantity of the uplink carriers in the different radio access technologies is less than a quantity of the downlink carriers in the different radio access technologies, the carrier aggregation capability of the UE further includes that both the uplink carriers in the different radio access technologies and the downlink carriers in the different radio access technologies are contiguous and that the downlink carriers in the different radio access technologies are contiguous and the uplink carriers in the different radio access technologies are non-contiguous.

Optionally, the UE capability information includes carrier aggregation capability indication information of the UE and a second field, and the second field carries a value of the carrier aggregation capability indication information of the UE; and when the value of the carrier aggregation capability indication information of the UE is a third state value, the UE capability information indicates that the downlink carriers in the different radio access technologies are contiguous and the uplink carriers in the different radio access technologies are non-contiguous.

Optionally, when the value of the carrier aggregation capability indication information of the UE is a fourth state value, the UE capability information indicates that both the uplink carriers in the different radio access technologies and the downlink carriers in the different radio access technologies are contiguous and the downlink carriers in the different radio access technologies are contiguous and the uplink carriers in the different radio access technologies are non-contiguous.

All related content of the operations in the foregoing method embodiment may be referenced in the function descriptions of the corresponding functional modules. Details are not described herein again.

In this embodiment, the communication apparatus 70 is presented in a form of function modules obtained through division in an integrated manner. The "module" herein may be a specified ASIC, a circuit, a processor and a memory that execute one or more software or firmware programs, an integrated logic circuit, and/or another component that can provide the foregoing functions. A person skilled in the art may understand that the communication apparatus 70 can be in the form shown in FIG. 3.

For example, the processor 301 in FIG. 3 may invoke the computer-executable instructions stored in the memory 303, so that the communication apparatus 70 performs the method for reporting user equipment capability information in the foregoing method embodiment.

For example, functions/implementation processes of the sending module 701 and the receiving module 702 in FIG. 7 may be implemented by the processor 301 in FIG. 3 invoking the computer-executable instructions stored in the memory 303. Alternatively, functions/implementation processes of the sending module 701 and the receiving module 702 in FIG. 7 may be implemented by the communication interface 304 in FIG. 3.

The communication apparatus 70 provided in this embodiment can perform the method of reporting user equipment capability information. Therefore, for a technical effect that can be achieved by the communication apparatus 70, refer to the foregoing method embodiments. Details are not described herein again.

Figure 8:
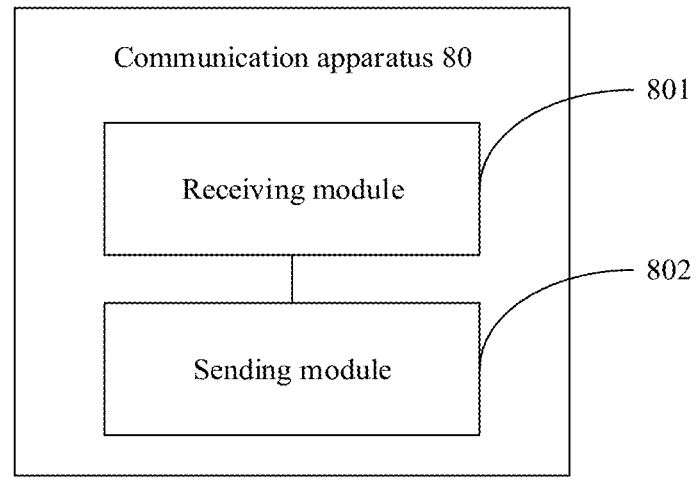
FIG. 8 is a schematic diagram 3 of a structure of a communication apparatus according to an embodiment of this application.

For example, when the function modules are obtained through division in an integrated manner, FIG. 8 is a schematic diagram of a structure of a communication apparatus 80. The communication apparatus 80 includes a receiving module 801 and a sending module 802.

The receiving module 801 is configured to receive UE capability enquiry information from a network device, where the UE supports a plurality of different radio access technologies, and the UE capability enquiry information is used to enquire a capability of the UE.

The sending module 802 is configured to send UE capability information to the network device based on the UE capability enquiry information, where the UE capability information includes third indication information and fourth indication information, the third indication information indicates whether downlink carriers in the different radio access technologies are contiguous, and the fourth indication information indicates whether uplink carriers in the different radio access technologies are contiguous.

Optionally, when the UE capability information does not include a third field, the third indication information indicates that the downlink carriers in the different radio access technologies are contiguous; the UE capability information includes a fourth field, and the fourth field carries a value of the fourth indication information; and when the value of the fourth indication information is a fifth state value, the fourth indication information indicates that the uplink carriers in the different radio access technologies are non-contiguous.

Optionally, the UE capability information includes a third field and a fourth field, the third field carries a value of the third indication information, and the fourth field carries a value of the fourth indication information.

Optionally, when the UE capability information does not include a third field and a fourth field, the third indication information indicates that the downlink carriers in the different radio access technologies are contiguous, and the fourth indication information indicates that the uplink carriers in the different radio access technologies are contiguous.

All related content of the operations in the foregoing method embodiment may be cited in function descriptions of the corresponding functional modules. Details are not described herein again.

In this embodiment, the communication apparatus 80 is presented in a form of function modules obtained through division in an integrated manner. The "module" herein may be a specified ASIC, a circuit, a processor and a memory that execute one or more software or firmware programs, an integrated logic circuit, and/or another component that can provide the foregoing functions. A person skilled in the art may understand that the communication apparatus 80 can be in the form shown in FIG. 3.

For example, the processor 301 in FIG. 3 may invoke the computer-executable instructions stored in the memory 303, so that the communication apparatus 80 performs the method for reporting user equipment capability information in the foregoing method embodiment.

For example, functions/implementation processes of the receiving module 801 and the sending module 802 in FIG. 8 may be implemented by the processor 301 in FIG. 3 invoking the computer-executable instructions stored in the memory 303. Alternatively, functions/implementation processes of the receiving module 801 and the sending module 802 in FIG. 8 may be implemented by the communication interface 304 in FIG. 3.

The communication apparatus 80 provided in this embodiment can perform the method for reporting user equipment capability information. Therefore, for a technical effect that can be achieved by the communication apparatus 80, refer to the foregoing method embodiment. Details are not described herein again.

Figure 9:
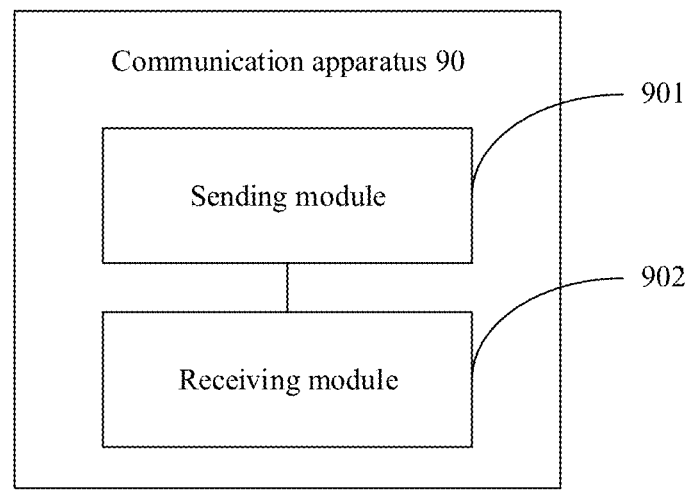
FIG. 9 is a schematic diagram 4 of a structure of a communication apparatus according to an embodiment of this application.

For example, when the function modules are obtained through division in an integrated manner, FIG. 9 is a schematic diagram of a structure of a communication apparatus 90. The communication apparatus 90 includes a sending module 901 and a receiving module 902.

The sending module 901 is configured to send UE capability enquiry information to a UE, where the UE supports a plurality of different radio access technologies, and the UE capability enquiry information is used to enquire a capability of the UE.

The receiving module 902 is configured to receive UE capability information from the UE, where the UE capability information includes third indication information and fourth indication information, the third indication information indicates whether downlink carriers in the different radio access technologies are contiguous, and the fourth indication information indicates whether uplink carriers in the different radio access technologies are contiguous.

Optionally, when the UE capability information does not include a third field, the third indication information indicates that the downlink carriers in the different radio access technologies are contiguous; the UE capability information includes a fourth field, and the fourth field carries a value of the fourth indication information; and when the value of the fourth indication information is a fifth state value, the fourth indication information indicates that the uplink carriers in the different radio access technologies are non-contiguous.

Optionally, the UE capability information includes a third field and a fourth field, the third field carries a value of the third indication information, and the fourth field carries a value of the fourth indication information.

Optionally, when the UE capability information does not include a third field and a fourth field, the third indication information indicates that the downlink carriers in the different radio access technologies are contiguous, and the fourth indication information indicates that the uplink carriers in the different radio access technologies are contiguous.

All related content of the operations in the foregoing method embodiment may be cited in function descriptions of the corresponding functional modules. Details are not described herein again.

In this embodiment, the communication apparatus 90 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions. A person skilled in the art may understand that the communication apparatus 90 can be in the form shown in FIG. 3.

For example, the processor 301 in FIG. 3 may invoke the computer-executable instructions stored in the memory 303, so that the communication apparatus 90 performs the method for reporting user equipment capability information in the foregoing method embodiment.

For example, functions/implementation processes of the sending module 901 and the receiving module 902 in FIG. 9 may be implemented by the processor 301 in FIG. 3 invoking the computer-executable instructions stored in the memory 303. Alternatively, functions/implementation processes of the sending module 901 and the receiving module 902 in FIG. 9 may be implemented by the communication interface 304 in FIG. 3.

The communication apparatus 90 provided in this embodiment can perform the method for reporting user equipment capability information. Therefore, for technical effects that can be achieved by the communication apparatus 90, refer to the foregoing method embodiment. Details are not described herein again.

Figure 10:
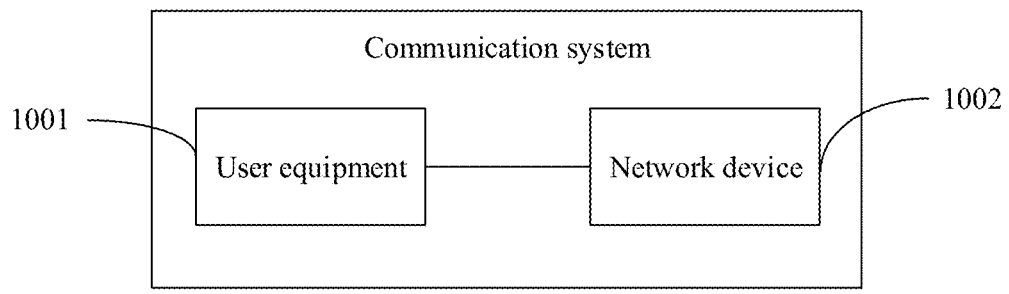
FIG. 10 is a schematic diagram of a structure of a communication system according to an embodiment of this application.

FIG. 10 is a schematic composition diagram of a communication system. As shown in FIG. 10, the communication system may include a user equipment 1001 and a network device 1002. It should be noted that FIG. 10 is merely an example. Network elements included in the communication system shown in FIG. 10 and the quantity of the network elements are not limited in this embodiment of this application.

The user equipment 1001 has a function of the communication apparatus 60 shown in FIG. 6 or a function of the communication apparatus 80 shown in FIG. 8, and may be configured to receive UE capability enquiry information from the network device 1002, and send UE capability information to the network device 1002 based on the UE capability enquiry information.

The network device 1002 has a function of the communication apparatus 70 shown in FIG. 7 or a function of the communication apparatus 90 shown in FIG. 9, and may be configured to send the UE capability enquiry information to the user equipment 1001, and receive the UE capability information from the user equipment 1001.

It should be noted that all related content of the steps in the foregoing method embodiments may be referenced in the function descriptions of corresponding network elements of the communication system. Details are not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions listed in the claims. Some measures are recorded in dependent claims that are different from each other, but this does not mean that the measures cannot be combined to produce a good effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method for reporting user equipment (UE) capability information, wherein the method comprises:
receiving, by a UE, UE capability enquiry information from a network device, wherein the UE supports a plurality of different radio access technologies, and the UE capability enquiry information is used to enquire a capability of the UE; and
sending, by the UE, UE capability information to the network device based on the UE capability enquiry information, wherein the UE capability information indicates a carrier aggregation capability of the UE, and the carrier aggregation capability of the UE comprises that downlink carriers in the different radio access technologies are contiguous and uplink carriers in the different radio access technologies are non-contiguous.

2. The method according to claim 1, wherein the UE capability information comprises first indication information and second indication information;
the first indication information indicates that the downlink carriers in the different radio access technologies are contiguous and the uplink carriers in the different radio access technologies are non-contiguous and whether the second indication information is valid; and
the second indication information indicates at least one of the following: both the downlink carriers in the different radio access technologies and the uplink carriers in the different radio access technologies are contiguous, or neither the downlink carriers in the different radio access technologies nor the uplink carriers in the different radio access technologies are contiguous.

3. The method according to claim 2, wherein the UE capability information comprises a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

4. The method according to claim 2, wherein the carrier aggregation capability of the UE further comprises at least one of the following: both the downlink carriers in the different radio access technologies and the uplink carriers in the different radio access technologies are contiguous, or neither the downlink carriers in the different radio access technologies nor the uplink carriers in the different radio access technologies are contiguous; and
the UE capability information comprises a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

5. The method according to claim 1, wherein when a quantity of the uplink carriers in the different radio access technologies is less than a quantity of the downlink carriers in the different radio access technologies, the carrier aggregation capability of the UE further comprises that both the uplink carriers in the different radio access technologies and the downlink carriers in the different radio access technologies are contiguous, and the downlink carriers in the different radio access technologies are contiguous and the uplink carriers in the different radio access technologies are non-contiguous;
wherein the UE capability information comprises carrier aggregation capability indication information of the UE and a second field, and the second field carries a value of the carrier aggregation capability indication information of the UE; and
when the value of the carrier aggregation capability indication information of the UE is a third state value, the UE capability information indicates that the downlink carriers in the different radio access technologies are contiguous and the uplink carriers in the different radio access technologies are non-contiguous.

6. A method for reporting user equipment (UE) capability information, wherein the method comprises:
sending, by a network device, UE capability enquiry information to a UE, wherein the UE supports a plurality of different radio access technologies, and the UE capability enquiry information is used to enquire a capability of the UE; and
receiving, by the network device, UE capability information from the UE, wherein the UE capability information indicates a carrier aggregation capability of the UE, and the carrier aggregation capability of the UE comprises that downlink carriers in the different radio access technologies are contiguous and uplink carriers in the different radio access technologies are non-contiguous.

7. The method according to claim 6, wherein the UE capability information comprises first indication information and second indication information;
the first indication information indicates that the downlink carriers in the different radio access technologies are contiguous and the uplink carriers in the different radio access technologies are non-contiguous and whether the second indication information is valid; and
the second indication information indicates at least one of the following: both the downlink carriers in the different radio access technologies and the uplink carriers in the different radio access technologies are contiguous, or neither the downlink carriers in the different radio access technologies nor the uplink carriers in the different radio access technologies are contiguous.

8. The method according to claim 7, wherein the UE capability information comprises a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

9. The method according to claim 7, wherein the carrier aggregation capability of the UE further comprises at least one of the following: both the downlink carriers in the different radio access technologies and the uplink carriers in the different radio access technologies are contiguous, or neither the downlink carriers in the different radio access technologies nor the uplink carriers in the different radio access technologies are contiguous; and
    the UE capability information comprises a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

10. The method according to claim 6, wherein when a quantity of the uplink carriers in the different radio access technologies is less than a quantity of the downlink carriers in the different radio access technologies, the carrier aggregation capability of the UE further comprises that both the uplink carriers in the different radio access technologies and the downlink carriers in the different radio access technologies are contiguous, and the downlink carriers in the different radio access technologies are contiguous and the uplink carriers in the different radio access technologies are non-contiguous;
    wherein the UE capability information comprises carrier aggregation capability indication information of the UE and a second field, and the second field carries a value of the carrier aggregation capability indication information of the UE; and
    when the value of the carrier aggregation capability indication information of the UE is a third state value, the UE capability information indicates that the downlink carriers in the different radio access technologies are contiguous and the uplink carriers in the different radio access technologies are non-contiguous.

11. A user equipment (UE), wherein the UE comprises:
at least one processor; and
a memory storing programming instructions for execution by the at least one processor, the programming instructions instructing the UE to perform operations comprising:
receiving UE capability enquiry information from a network device, wherein the UE supports a plurality of different radio access technologies, and the UE capability enquiry information is used to enquire a capability of the UE; and
sending UE capability information to the network device based on the UE capability enquiry information, wherein the UE capability information indicates a carrier aggregation capability of the UE, and the carrier aggregation capability of the UE comprises that downlink carriers in the different radio access technologies are contiguous and uplink carriers in the different radio access technologies are non-contiguous.

12. The UE according to claim 11, wherein the UE capability information comprises first indication information and second indication information;
    the first indication information indicates that the downlink carriers in the different radio access technologies are contiguous and the uplink carriers in the different radio access technologies are non-contiguous and whether the second indication information is valid; and
    the second indication information indicates at least one of the following: both the downlink carriers in the different radio access technologies and the uplink carriers in the different radio access technologies are contiguous, or neither the downlink carriers in the different radio access technologies nor the uplink carriers in the different radio access technologies are contiguous.

13. The UE according to claim 12, wherein the UE capability information comprises a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

14. The UE according to claim 12, wherein the carrier aggregation capability of the UE further comprises at least one of the following: both the downlink carriers in the different radio access technologies and the uplink carriers in the different radio access technologies are contiguous, or neither the downlink carriers in the different radio access technologies nor the uplink carriers in the different radio access technologies are contiguous; and
    the UE capability information comprises a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

15. The UE according to claim 11, wherein when a quantity of the uplink carriers in the different radio access technologies is less than a quantity of the downlink carriers in the different radio access technologies, the carrier aggregation capability of the UE further comprises that both the uplink carriers in the different radio access technologies and the downlink carriers in the different radio access technologies are contiguous, and the downlink carriers in the different radio access technologies are contiguous and the uplink carriers in the different radio access technologies are non-contiguous;
    wherein the UE capability information comprises carrier aggregation capability indication information of the UE and a second field, and the second field carries a value of the carrier aggregation capability indication information of the UE; and
    when the value of the carrier aggregation capability indication information of the UE is a third state value, the UE capability information indicates that the downlink carriers in the different radio access technologies are contiguous and the uplink carriers in the different radio access technologies are non-contiguous.

16. A network device, wherein the network device comprises:
   at least one processor; and
   a memory storing programming instructions for execution by the at least one processor, the programming instructions instructing the network device to perform:
   sending user equipment (UE) capability enquiry information to a UE, wherein the UE supports a plurality of different radio access technologies, and the UE capability enquiry information is used to enquire a capability of the UE; and
   receiving UE capability information from the UE, wherein the UE capability information indicates a carrier aggregation capability of the UE, and the carrier aggregation capability of the UE comprises that downlink carriers in the different radio access technologies are contiguous and uplink carriers in the different radio access technologies are non-contiguous.

17. The network device according to claim 16, wherein the UE capability information comprises first indication information and second indication information;
   the first indication information indicates that the downlink carriers in the different radio access technologies are contiguous and the uplink carriers in the different radio access technologies are non-contiguous and whether the second indication information is valid; and
   the second indication information indicates at least one of the following: both the downlink carriers in the different radio access technologies and the uplink carriers in the different radio access technologies are contiguous, or neither the downlink carriers in the different radio access technologies nor the uplink carriers in the different radio access technologies are contiguous.

18. The network device according to claim 17, wherein the UE capability information comprises a first field, the first field carries a value of the first indication information, the value of the first indication information is a first state value, and the first indication information indicates that the downlink carriers in the different radio access technologies are contiguous and the uplink carriers in the different radio access technologies are non-contiguous and that the second indication information is invalid.

19. The network device according to claim 17, wherein the carrier aggregation capability of the UE further comprises at least one of the following: both the downlink carriers in the different radio access technologies and the uplink carriers in the different radio access technologies are contiguous, or neither the downlink carriers in the different radio access technologies nor the uplink carriers in the different radio access technologies are contiguous; and
   the UE capability information comprises a first field, the first field carries a value of the first indication information, the value of the first indication information is a second state value, and the first indication information indicates that the downlink carriers in the different radio access technologies are contiguous and the uplink carriers in the different radio access technologies are non-contiguous and that the second indication information is valid.

20. The network device according to claim 16, wherein when a quantity of the uplink carriers in the different radio access technologies is less than a quantity of the downlink carriers in the different radio access technologies, the carrier aggregation capability of the UE further comprises that both the uplink carriers in the different radio access technologies and the downlink carriers in the different radio access technologies are contiguous, and the downlink carriers in the different radio access technologies are contiguous and the uplink carriers in the different radio access technologies are non-contiguous;
   wherein the UE capability information comprises carrier aggregation capability indication information of the UE and a second field, and the second field carries a value of the carrier aggregation capability indication information of the UE; and
   when the value of the carrier aggregation capability indication information of the UE is a third state value, the UE capability information indicates that the downlink carriers in the different radio access technologies are contiguous and the uplink carriers in the different radio access technologies are non-contiguous.

* * * * *